(12) United States Patent
Matsunaga

(10) Patent No.: US 7,408,997 B2
(45) Date of Patent: Aug. 5, 2008

(54) MODULATION/DEMODULATION APPARATUS USING MATRIX AND ANTI-MATRIX

(75) Inventor: Hayami Matsunaga, Osaka (JP)

(73) Assignee: W.T. Device Company, Inc., Osaka (JP)

(*) Notice: Subject to any disclaimer, the term of this patent is extended or adjusted under 35 U.S.C. 154(b) by 675 days.

(21) Appl. No.: 10/496,162

(22) PCT Filed: Nov. 28, 2002

(86) PCT No.: PCT/JP02/12460

§ 371 (c)(1),
(2), (4) Date: May 20, 2004

(87) PCT Pub. No.: WO03/047133

PCT Pub. Date: Jun. 5, 2003

(65) Prior Publication Data

US 2004/0258169 A1    Dec. 23, 2004

(30) Foreign Application Priority Data

Nov. 30, 2001    (JP) ............... 2001-367226

(51) Int. Cl.
*H04K 1/10* (2006.01)

(52) U.S. Cl. ............... 375/260; 375/316; 455/59; 370/206

(58) Field of Classification Search ............... 375/260; 370/206; 455/59
See application file for complete search history.

(56) References Cited

U.S. PATENT DOCUMENTS 6,532,256 B2 *  3/2003  Miller ............... 375/222
6,549,565 B1 *  4/2003  Buehrer et al. ............... 375/142

FOREIGN PATENT DOCUMENTS

| JP | 7-46286 | 2/1995 |
| JP | 7-87148 | 3/1995 |
| JP | 7-143087 | 6/1995 |
| JP | 8-149167 | 6/1996 |
| JP | 11-308192 | 11/1999 |
| JP | 2000-307531 | 11/2000 |

OTHER PUBLICATIONS

International Search Report corresponding to application No. PCT/JP02/12460 dated Mar. 25, 2003.
Jouko Vankka et al., "A Multicarrier QAM Modulator" 2000 IEEE Transactions on Circuits and Systems-II., Analog and Digital Signal Processing, vol. 47, No. 1, Jan. 2000.

* cited by examiner

*Primary Examiner*—Mohammed Ghayour
*Assistant Examiner*—Juan Alberto Torres
(74) *Attorney, Agent, or Firm*—RatnerPrestia

(57) ABSTRACT

A modulation and demodulation system is provided. The system uses n sub-carrier frequencies and an oversampling positive integer and includes a modulation circuit and a demodulation circuit. The modulation circuit includes a modulation ROM that stores columns of elements independently in a modulation ROM matrix. The demodulation circuit includes 2n numbers of a ROM1 that stores elements of a combined matrix. The combined matrix is generated by combining a number of inverse matrices where the inverse matrices are generated from the modulation ROM.

11 Claims, 27 Drawing Sheets

FIGURE 10

| $q$ | $r$ | $i$ | $p$ | 0 | | 1 | | 2 | | 3 | |
|---|---|---|---|---|---|---|---|---|---|---|---|
| | | | $r$ | 1 | 2 | 1 | 2 | 1 | 2 | 1 | 2 |
| | | | $j$ | 1 | 2 | 3 | 4 | 5 | 6 | 7 | 8 |
| 0 | 1 | 1 | | 0.7931 | 0.6091 | 0.8820 | 0.4712 | 0.9238 | 0.3830 | 0.9570 | 0.2901 |
| | 2 | 2 | | 0.2580 | 0.9661 | 0.5559 | 0.8312 | 0.7067 | 0.7075 | 0.8317 | 0.5552 |
| | 3 | 3 | | -0.3839 | 0.9234 | 0.0987 | 0.9951 | 0.3818 | 0.9242 | 0.6349 | 0.7726 |
| | 4 | 4 | | -0.8669 | 0.4985 | -0.3819 | 0.9242 | -0.0012 | 1.0000 | 0.3834 | 0.9236 |
| 1 | 1 | 5 | | -0.9912 | -0.1326 | -0.7723 | 0.6353 | -0.3841 | 0.9233 | 0.0990 | 0.9951 |
| | 2 | 6 | | -0.7053 | -0.7089 | -0.9805 | 0.1964 | -0.7084 | 0.7058 | -0.1939 | 0.9810 |
| | 3 | 7 | | -0.1276 | -0.9918 | -0.9574 | -0.2888 | -0.9247 | 0.3807 | -0.4702 | 0.8826 |
| | 4 | 8 | | 0.5030 | -0.8643 | -0.7084 | -0.7058 | -1.0000 | -0.0024 | -0.7060 | 0.7082 |
| 2 | 1 | 9 | | 0.9253 | -0.3791 | -0.2992 | -0.9564 | -0.9228 | -0.3852 | -0.8811 | 0.4730 |
| | 2 | 10 | | 0.9648 | 0.2629 | 0.1929 | -0.9812 | -0.7050 | -0.7092 | -0.9804 | 0.1970 |
| | 3 | 11 | | 0.6050 | 0.7962 | 0.6325 | -0.7746 | -0.3796 | -0.9251 | -0.9954 | -0.0958 |
| | 4 | 12 | | -0.0051 | 1.0000 | 0.9228 | -0.3852 | 0.0036 | -1.0000 | -0.9248 | -0.3805 |
| 3 | 1 | 13 | | -0.6132 | 0.7900 | 0.9955 | 0.0951 | 0.3863 | -0.9224 | -0.7747 | -0.6324 |
| | 2 | 14 | | -0.9675 | 0.2530 | 0.8332 | 0.5530 | 0.7101 | -0.7041 | -0.5579 | -0.8299 |
| | 3 | 15 | | -0.9214 | -0.3886 | 0.4744 | 0.8803 | 0.9256 | -0.3785 | -0.2931 | -0.9561 |
| | 4 | 16 | | -0.4941 | -0.8694 | 0.0036 | 1.0000 | 1.0000 | 0.0048 | -0.0032 | -1.0000 |
| 4 | 1 | 17 | | 0.1377 | -0.9905 | -0.4680 | 0.8837 | 0.9219 | 0.3874 | 0.2870 | -0.9579 |
| | 2 | 18 | | 0.7125 | -0.7017 | -0.8292 | 0.5589 | 0.7033 | 0.7109 | 0.5526 | -0.8335 |
| | 3 | 19 | | 0.9925 | -0.1225 | -0.9948 | 0.1022 | 0.3774 | 0.9261 | 0.7706 | -0.6373 |
| | 4 | 20 | | 0.8617 | 0.5074 | -0.9256 | -0.3785 | -0.0060 | 1.0000 | 0.9223 | -0.3864 |
| 5 | 1 | 21 | | 0.3744 | 0.9273 | -0.6380 | -0.7700 | -0.3885 | 0.9214 | 0.9948 | -0.1022 |
| | 2 | 22 | | -0.2679 | 0.9635 | -0.1999 | -0.9798 | -0.7118 | 0.7024 | 0.9816 | 0.1908 |
| | 3 | 23 | | -0.7993 | 0.6009 | 0.2854 | -0.9584 | -0.9265 | 0.3763 | 0.8841 | 0.4673 |
| | 4 | 24 | | -0.9999 | -0.0102 | 0.7033 | -0.7109 | -1.0000 | -0.0072 | 0.7105 | 0.7037 |
| 6 | 1 | 25 | | -0.7868 | -0.6172 | 0.9553 | -0.2956 | -0.9210 | -0.3896 | 0.4758 | 0.8796 |
| | 2 | 26 | | -0.2481 | -0.9687 | 0.9819 | 0.1894 | -0.7016 | -0.7126 | 0.2002 | 0.9798 |
| | 3 | 27 | | 0.3933 | -0.9194 | 0.7768 | 0.6297 | -0.3752 | -0.9270 | -0.0927 | 0.9957 |
| | 4 | 28 | | 0.8719 | -0.4896 | 0.3885 | 0.9215 | 0.0084 | -1.0000 | -0.3775 | 0.9260 |
| 7 | 1 | 29 | | 0.9898 | 0.1428 | -0.0916 | 0.9958 | 0.3907 | -0.9205 | -0.6299 | 0.7767 |
| | 2 | 30 | | 0.6980 | 0.7161 | -0.5500 | 0.8352 | 0.7135 | -0.7007 | -0.8281 | 0.5605 |
| | 3 | 31 | | 0.1174 | 0.9931 | -0.8786 | 0.4775 | 0.9274 | -0.3740 | -0.9551 | 0.2962 |
| | 4 | 32 | | -0.5118 | 0.8591 | -1.0000 | 0.0072 | 1.0000 | 0.0096 | -1.0000 | 0.0064 |

| $p$ | 0 | | 1 | | 2 | | 3 | |
|---|---|---|---|---|---|---|---|---|
| $r$ | 1 | 2 | 1 | 2 | 1 | 2 | 1 | 2 |
| $q$ \ $j$ | 1 | 2 | 3 | 4 | 5 | 6 | 7 | 8 |
| 0 | 0.7931 | 0.6091 | 0.8820 | 0.4712 | 0.9238 | 0.3830 | 0.9570 | 0.2901 |
| 1 | -0.9912 | -0.1326 | -0.7723 | 0.6353 | -0.3841 | 0.9233 | 0.0990 | 0.9951 |
| 2 | 0.9253 | -0.3791 | -0.2922 | -0.9564 | -0.9228 | -0.3852 | -0.8811 | 0.4730 |
| 3 | -0.6132 | 0.7900 | 0.9955 | 0.0951 | 0.3863 | -0.9224 | -0.7747 | -0.6324 |
| 4 | 0.1377 | -0.9905 | -0.4680 | 0.8837 | 0.9219 | 0.3874 | 0.2870 | -0.9579 |
| 5 | 0.3744 | 0.9273 | -0.6380 | -0.7700 | -0.3885 | 0.9214 | 0.9948 | -0.1022 |
| 6 | -0.7868 | -0.6172 | 0.9553 | -0.2956 | -0.9210 | -0.3896 | 0.4758 | 0.8796 |
| 7 | 0.9898 | 0.1428 | -0.0916 | 0.9958 | 0.3907 | -0.9205 | -0.6299 | 0.7767 |

FIGURE 11A

| $p$ | 0 | | 1 | | 2 | | 3 | |
|---|---|---|---|---|---|---|---|---|
| $r$ | 1 | 2 | 1 | 2 | 1 | 2 | 1 | 2 |
| $q$ \ $j$ | 1 | 2 | 3 | 4 | 5 | 6 | 7 | 8 |
| 0 | 0.4731 | 0.3770 | 1.1419 | 0.9096 | 1.1411 | 0.9106 | 0.4728 | 0.3773 |
| 1 | 0.0658 | 0.2928 | 0.1586 | 0.7069 | 0.1580 | 0.7070 | 0.0656 | 0.2929 |
| 2 | 0.8459 | 0.7289 | 1.3268 | 1.4849 | 1.2389 | 0.6677 | 0.7577 | -0.0911 |
| 3 | 0.4480 | 1.3872 | 1.6732 | 2.4612 | 2.5938 | 2.0283 | 1.3717 | 0.9529 |
| 4 | -0.3821 | -1.5709 | -2.4948 | -3.1259 | -3.1454 | -2.8527 | -1.9564 | -0.9097 |
| 5 | 0.9092 | 1.1926 | 1.5310 | 1.3061 | 1.2585 | 0.6558 | 0.2499 | -0.3810 |
| 6 | -0.3523 | -0.6481 | -0.9441 | -0.7554 | -0.3619 | 0.1264 | 0.2291 | 0.2326 |
| 7 | -0.1056 | -0.5488 | -1.1693 | -1.7617 | -1.8824 | -1.4975 | -0.8178 | -0.2849 |

| p | 0 | | 1 | | 2 | | 3 | |
|---|---|---|---|---|---|---|---|---|
| r | 1 | 2 | 1 | 2 | 1 | 2 | 1 | 2 |
| q \ j | 1 | 2 | 3 | 4 | 5 | 6 | 7 | 8 |
| 0 | 0.3351 | 0.1206 | 0.8091 | 0.2909 | 0.8088 | 0.2916 | 0.3351 | 0.1209 |
| 1 | 0.3403 | 0.4618 | 0.8213 | 1.1147 | 0.8203 | 1.1154 | 0.3400 | 0.4621 |
| 2 | 0.5350 | -0.0107 | 0.3819 | 0.1500 | -0.1295 | -0.3669 | 0.0219 | -0.5293 |
| 3 | 0.7938 | 1.5670 | 2.1010 | 2.8705 | 2.8715 | 2.1036 | 1.5669 | 0.7976 |
| 4 | -0.7012 | -1.9079 | -2.8909 | -3.3878 | -3.3876 | -2.8863 | -1.9030 | -0.6944 |
| 5 | 0.6936 | 0.5000 | 0.4588 | 0.0094 | -0.0421 | -0.4867 | -0.5184 | -0.7003 |
| 6 | -0.3065 | -0.4610 | -0.5643 | -0.2119 | 0.1997 | 0.5554 | 0.4565 | 0.3052 |
| 7 | -0.2032 | -0.7132 | -1.3929 | -1.9051 | -1.9064 | -1.3964 | -0.7161 | -0.2052 |

FIGURE 11D

| p | 0 | | 1 | | 2 | | 3 | |
|---|---|---|---|---|---|---|---|---|
| r | 1 | 2 | 1 | 2 | 1 | 2 | 1 | 2 |
| q \ j | 1 | 2 | 3 | 4 | 5 | 6 | 7 | 8 |
| 0 | 0.0585 | -0.1856 | 0.1414 | -0.4483 | 0.1418 | -0.4482 | 0.0586 | -0.1856 |
| 1 | 0.4740 | 0.4398 | 1.1442 | 1.0612 | 1.1432 | 1.0622 | 0.4737 | 0.4401 |
| 2 | 0.0979 | -0.7478 | -0.6531 | -1.2202 | -1.4673 | -1.3148 | -0.7190 | -0.8427 |
| 3 | 0.9522 | 1.3771 | 2.0331 | 2.6026 | 2.4718 | 1.6826 | 1.3924 | 0.4541 |
| 4 | -0.9133 | -1.9539 | -2.8462 | -3.1332 | -3.1132 | -2.4799 | -1.5594 | -0.3733 |
| 5 | 0.3722 | -0.2687 | -0.6832 | -1.2887 | -1.3362 | -1.5549 | -1.2076 | -0.9129 |
| 6 | -0.2344 | -0.2343 | -0.1359 | 0.3499 | 0.7442 | 0.9366 | 0.6446 | 0.3516 |
| 7 | -0.2834 | -0.8163 | -1.4967 | -1.8847 | -1.7665 | -1.1753 | -0.5529 | -0.1078 |

FIGURE 11E

| p | 0 | | 1 | | 2 | | 3 | |
|---|---|---|---|---|---|---|---|---|
| r | 1 | 2 | 1 | 2 | 1 | 2 | 1 | 2 |
| q \ j | 1 | 2 | 3 | 4 | 5 | 6 | 7 | 8 |
| 0 | -0.2423 | -0.4151 | -0.5848 | -1.0019 | -0.5839 | -1.0024 | -0.2420 | -0.4153 |
| 1 | 0.4116 | 0.2357 | 0.9936 | 0.5686 | 0.9931 | 0.5695 | 0.4114 | 0.2360 |
| 2 | -0.3624 | -1.3085 | -1.5340 | -2.3026 | -2.4589 | -1.9525 | -1.2902 | -0.9572 |
| 3 | 0.8860 | 0.8623 | 1.4855 | 1.7206 | 1.4888 | 0.8646 | 0.8893 | 0.0034 |
| 4 | -0.9862 | -1.7021 | -2.3676 | -2.4008 | -2.3642 | -4.6954 | -0.9780 | 0.0047 |
| 5 | -0.0059 | -0.9965 | -1.7211 | -2.3903 | -2.4266 | -2.3861 | -1.7128 | -0.9862 |
| 6 | -0.1421 | 0.0126 | 0.3041 | 0.8816 | 1.2246 | 1.2372 | 0.7773 | 0.3678 |
| 7 | -0.3392 | -0.8491 | -1.4717 | -1.7021 | -1.4747 | -0.8531 | -0.3421 | -0.0012 |

| i | $d_i$ |
|---|---|
| 1 | 81.1867 |
| 2 | 65.2033 |
| 3 | 37.1970 |
| 4 | 5.5872 |
| 5 | -21.2066 |
| 6 | -37.4566 |
| 7 | -41.6358 |
| 8 | -36.2772 |
| 9 | -26.3720 |
| 10 | -17.0527 |
| 11 | -11.5364 |
| 12 | -10.1358 |
| 13 | -10.6513 |
| 14 | -9.8615 |
| 15 | -5.3745 |
| 16 | 3.0202 |
| 17 | 13.1080 |
| 18 | 21.2131 |
| 19 | 23.9238 |
| 20 | 19.7870 |
| 21 | 10.1836 |
| 22 | -1.0532 |
| 23 | -9.1617 |
| 24 | -10.4938 |
| 25 | -4.1968 |
| 26 | 7.2201 |
| 27 | 18.7377 |
| 28 | 24.8063 |
| 29 | 21.6671 |
| 30 | 9.0569 |
| 31 | -9.4422 |
| 32 | 79.6386 |

FIGURE 12A

| $i$ | $d_i$ |
|---|---|
| 1 | 79.7745 |
| 2 | 81.1090 |
| 3 | 65.0050 |
| 4 | 37.0460 |
| 5 | 5.6597 |
| 6 | -21.4443 |
| 7 | -37.4286 |
| 8 | -41.5717 |
| 9 | -36.3611 |
| 10 | -26.2757 |
| 11 | -17.1823 |
| 12 | -11.3325 |
| 13 | -10.1673 |
| 14 | -10.4529 |
| 15 | -9.9276 |
| 16 | -5.3161 |
| 17 | 3.3021 |
| 18 | 12.8503 |
| 19 | 21.3957 |
| 20 | 23.7096 |
| 21 | 19.4529 |
| 22 | 10.3367 |
| 23 | -1.1009 |
| 24 | -9.2484 |
| 25 | -10.4869 |
| 26 | -3.8698 |
| 27 | 7.3148 |
| 28 | 18.5145 |
| 29 | 24.5774 |
| 30 | 21.4752 |
| 31 | 9.2918 |
| 32 | -9.5909 |

| q | r | j | $x_j$ |
|---|---|---|---|
| 0 | 1 | 1 | 10.9686 |
|   | 2 | 2 | 4.0607 |
| 1 | 1 | 3 | 12.015 |
|   | 2 | 4 | 8.7172 |
| 2 | 1 | 5 | 12.6055 |
|   | 2 | 6 | 11.1354 |
| 3 | 1 | 7 | 13.4383 |
|   | 2 | 8 | 12.7259 |

FIGURE 13B

| p | $\overline{D}_{2p+1}^2$ (test) + $\overline{D}_{2p+2}^2$ (test) |
|---|---|
| 0 | 136.8002 |
| 1 | 220.3448 |
| 2 | 282.8956 |
| 3 | 342.5367 |

FIGURE 13C

| p | $\overline{D}_{2p+1}{}^2$ (test) + $\overline{D}_{2p+2}$ (test) |
|---|---|
| 0 | 15.0293 |
| 1 | 20.7322 |
| 2 | 23.7409 |
| 3 | 26.1342 |

FIGURE 13D

| p | $\overline{D}_{2p+1}$ (test) + $\overline{D}_{2p+2}$ (test) |
|---|---|
| 0 | 6.908 |
| 1 | 3.297 |
| 2 | 1.4702 |
| 3 | 0.7124 |

| $i$ | $d_i$ |
|---|---|
| 1 | 3.8853 |
| 2 | 0.4624 |
| 3 | -6.1088 |
| 4 | -13.2972 |
| 5 | -17.9469 |
| 6 | -17.698 |
| 7 | -12.1194 |
| 8 | -3.0384 |
| 9 | 6.1155 |
| 10 | 11.7103 |
| 11 | 11.4849 |
| 12 | 5.6252 |
| 13 | -3.1445 |
| 14 | -10.5474 |
| 15 | -12.4635 |
| 16 | -6.6923 |
| 17 | 5.9496 |
| 18 | 21.6735 |
| 19 | 34.9428 |
| 20 | 40.4428 |
| 21 | 35.062 |
| 22 | 19.1293 |
| 23 | -3.5679 |
| 24 | -26.9999 |
| 25 | -44.8891 |
| 26 | -52.7427 |
| 27 | -49.1863 |
| 28 | -36.1509 |
| 29 | -17.9151 |
| 30 | 0.5586 |
| 31 | 15.3163 |
| 32 | 3.3394 |

FIGURE 14A

| $i$ | $d_i$ |
|---|---|
| 1 | 3.4752 |
| 2 | 3.8076 |
| 3 | 0.2641 |
| 4 | -6.2598 |
| 5 | -13.2246 |
| 6 | -18.1845 |
| 7 | -17.6699 |
| 8 | -12.0553 |
| 9 | -3.1223 |
| 10 | 6.2118 |
| 11 | 11.5807 |
| 12 | 11.6888 |
| 13 | 5.5937 |
| 14 | -2.9461 |
| 15 | -10.6135 |
| 16 | -12.4051 |
| 17 | -6.4104 |
| 18 | 5.6919 |
| 19 | 21.8561 |
| 20 | 34.7286 |
| 21 | 40.1087 |
| 22 | 35.2151 |
| 23 | 19.0815 |
| 24 | -3.6546 |
| 25 | -26.993 |
| 26 | -44.5621 |
| 27 | -52.648 |
| 28 | -49.4096 |
| 29 | -36.3798 |
| 30 | -18.107 |
| 31 | 0.7936 |
| 32 | 15.1676 |

| q | r | j | $x_j$ |
|---|---|---|---|
| 0 | 1 | 1 | 3.9847 |
|   | 2 | 2 | 7.2244 |
| 1 | 1 | 3 | −2.1027 |
|   | 2 | 4 | −10.1946 |
| 2 | 1 | 5 | 1.5695 |
|   | 2 | 6 | 11.9217 |
| 3 | 1 | 7 | −1.3175 |
|   | 2 | 8 | −13.1774 |

FIGURE 15B

| q | r | j | $x_j$ |
|---|---|---|---|
| 0 | 1 | 1 | 1.0945 |
|   | 2 | 2 | 14.9236 |
| 1 | 1 | 3 | −0.679 |
|   | 2 | 4 | −14.8599 |
| 2 | 1 | 5 | 1.0464 |
|   | 2 | 6 | 15.1295 |
| 3 | 1 | 7 | −1.0984 |
|   | 2 | 8 | −15.1392 |

FIGURE 15C

| q | r | j | $x_j$ |
|---|---|---|---|
| 0 | 1 | 1 | 1 |
|   | 2 | 2 | 15 |
| 1 | 1 | 3 | −1 |
|   | 2 | 4 | −15 |
| 2 | 1 | 5 | 1 |
|   | 2 | 6 | 15 |
| 3 | 1 | 7 | −1 |
|   | 2 | 8 | −15 |

FIGURE 16

| q | r | i | p | 0 | | 1 | | 2 | | 3 | |
|---|---|---|---|---|---|---|---|---|---|---|---|
| | | | r | 1 | 2 | 1 | 2 | 1 | 2 | 1 | 2 |
| | | | j | 1 | 2 | 3 | 4 | 5 | 6 | 7 | 8 |
| 0 | 1 | 1 | | E584 | CDF5 | F0E5 | BC50 | F63D | B105 | FA7E | A521 |
| | 2 | 2 | | A107 | FBA9 | C728 | EA65 | DA73 | DA90 | EA75 | C710 |
| | 3 | 3 | | 4EE0 | F632 | 8CA1 | FF5F | B0DF | F64D | D144 | E2E3 |
| | 4 | 4 | | 110C | BFD2 | 4F1F | F64C | 7FD6 | FFFF | B116 | F636 |
| 1 | 1 | 5 | | 0121 | 6F0A | 1D25 | D14F | 4ED4 | F62D | 8CAF | FF5E |
| | 2 | 6 | | 25B5 | 2546 | 027E | 9923 | 2552 | DA56 | 6731 | FD92 |
| | 3 | 7 | | 6FA5 | 010D | 0574 | 5B08 | 09A3 | B0B8 | 43D6 | F0FA |
| | 4 | 8 | | C05A | 115A | 2555 | 25A6 | 0000 | 7FAD | 25A6 | DAAA |
| 2 | 1 | 9 | | F66D | 4F70 | 5A9A | 0596 | 09E2 | 4EAE | 0F3C | BC8F |
| | 2 | 10 | | FB80 | A19E | 98B1 | 0268 | 25C6 | 2535 | 0284 | 993F |
| | 3 | 11 | | CD79 | E5E3 | D0F6 | 1CDC | 4F6D | 0993 | 0096 | 73C3 |
| | 4 | 12 | | 7F63 | FFFF | F620 | 4EB4 | 807B | 0000 | 099D | 4F54 |
| 3 | 1 | 13 | | 318E | E524 | FF6A | 8C2E | B177 | 09F2 | 1CD3 | 2F15 |
| | 2 | 14 | | 042E | A070 | EAA5 | C6C8 | DAE7 | 25E4 | 388F | 15CA |
| | 3 | 15 | | 0A0A | 4E4F | BCB5 | F0AF | F67B | 4F93 | 5A70 | 05A3 |
| | 4 | 16 | | 40B5 | 10BE | 8073 | FFFF | FFFF | 80A4 | 7F8C | 0000 |
| 4 | 1 | 17 | | 9190 | 0136 | 4415 | F11B | F5FD | B19D | A4B2 | 0560 |
| | 2 | 18 | | DB27 | 2624 | 15DB | C788 | D9FE | DB04 | C6B0 | 154A |
| | 3 | 19 | | FF06 | 7040 | 00AB | 8D14 | B046 | F68B | E29A | 2E62 |
| | 4 | 20 | | EE56 | C0E1 | 0987 | 4F89 | 7F32 | FFFE | F609 | 4E7F |
| 5 | 1 | 21 | | AFFE | F6A8 | 2E57 | 1D6E | 4E3C | F5ED | FF52 | 72DD |
| | 2 | 22 | | 5DCA | FB57 | 666B | 0295 | 24DE | D9E1 | FDA8 | 985D |
| | 3 | 23 | | 19BE | CCFC | A489 | 0553 | 0964 | B020 | F130 | BBC4 |
| | 4 | 24 | | 0001 | 7EC7 | DA07 | 2503 | 0001 | 7F08 | DAFC | DA07 |
| 6 | 1 | 25 | | 1B3B | 3112 | FA47 | 5A2B | 0A22 | 4E17 | BCF5 | F08C |
| | 2 | 26 | | 6027 | 0406 | FDAD | 9840 | 263B | 24C1 | 99B0 | FD64 |
| | 3 | 27 | | B240 | 0A47 | E36C | D09C | 5005 | 0955 | 7435 | FF74 |
| | 4 | 28 | | EF8E | 413D | B1B5 | F5F3 | 8120 | 0001 | 4FBF | F68D |
| 7 | 1 | 29 | | FEB3 | 922B | 7444 | FF75 | B20E | 0A32 | 2F6E | E375 |
| | 2 | 30 | | D96B | DB95 | 3997 | EAE4 | DB5B | 2659 | 160B | C7CF |
| | 3 | 31 | | 8F23 | FF19 | 0F87 | BD1B | F6B9 | 502B | 05C5 | A5FD |
| | 4 | 32 | | 3E98 | EE06 | 0001 | 80E6 | FFFD | 8149 | 0001 | 80E6 |

FIGURE 17A

| q\i | p | 0 | | 1 | | 2 | | 3 | |
|---|---|---|---|---|---|---|---|---|---|
| | r | 1 | 2 | 1 | 2 | 1 | 2 | 1 | 2 |
| | j | 1 | 2 | 3 | 4 | 5 | 6 | 7 | 8 |
| 0 | | 9D62 | 997B | B890 | AF21 | B887 | AF2C | 9D5F | 997E |
| 1 | | 8CD2 | 960D | 9094 | A6DE | 908D | A6DF | 8CD0 | 960D |
| 2 | | AC89 | A7C5 | C013 | C67C | BC7F | A548 | A8F2 | 8674 |
| 3 | | 9C5E | C288 | CE26 | EE2C | F38D | DC95 | C1E6 | B0E2 |
| 4 | | 7AA0 | 4A52 | 24CB | 0B29 | 0A60 | 1643 | 3AAC | 6533 |
| 5 | | AF18 | BA97 | C855 | BF2F | BD43 | A4C7 | 944D | 7AAC |
| 6 | | 7BD9 | 6FD3 | 63CC | 6B74 | 7B6F | 8F46 | 9374 | 939A |
| 7 | | 85E0 | 73E0 | 5AAE | 429D | 3DB5 | 4D55 | 68F1 | 7E95 |

FIGURE 17B

| q\i | p | 0 | | 1 | | 2 | | 3 | |
|---|---|---|---|---|---|---|---|---|---|
| | r | 1 | 2 | 1 | 2 | 1 | 2 | 1 | 2 |
| | j | 1 | 2 | 3 | 4 | 5 | 6 | 7 | 8 |
| 0 | | 97C8 | 8F11 | AB0D | 95FE | AB0A | 9606 | 97C7 | 8F13 |
| 1 | | 97FB | 9CEC | AB83 | B772 | AB79 | B77A | 97F7 | 9CEF |
| 2 | | 9FE6 | 89B7 | 99AC | 903D | 84E5 | 7B3E | 8B0C | 74A5 |
| 3 | | AA6B | C9D6 | DF89 | FECC | FED7 | DFA4 | C9D5 | AA92 |
| 4 | | 6DA9 | 3CA4 | 14B6 | 0089 | 008B | 14E7 | 3CD9 | 6DF2 |
| 5 | | A655 | 9E73 | 9CC5 | 8A81 | 886D | 765D | 7516 | 6DB3 |
| 6 | | 7DB4 | 776C | 7737 | 8187 | 923E | A0B3 | 9CB0 | 968D |
| 7 | | 81E8 | 6D32 | 5198 | 3CC8 | 3CB9 | 516F | 6D11 | 81D2 |

FIGURE 17C

| q\i | p | 0 | | 1 | | 2 | | 3 | |
|---|---|---|---|---|---|---|---|---|---|
| | r | 1 | 2 | 1 | 2 | 1 | 2 | 1 | 2 |
| | j | 1 | 2 | 3 | 4 | 5 | 6 | 7 | 8 |
| 0 | | 8C8B | 829F | 8FED | 77F6 | 8FF2 | 77F7 | 8C8D | 829F |
| 1 | | 9D6B | 9C08 | B8A5 | B549 | B89B | B554 | 9D68 | 9C0B |
| 2 | | 8E22 | 6BC3 | 6F9D | 588F | 4E89 | 54B8 | 6CF0 | 67E9 |
| 3 | | B0DB | C21D | DCC6 | F3E7 | EE98 | CE87 | C2BD | 9C9C |
| 4 | | 650B | 3AC7 | 1689 | 0AE5 | 0BB3 | 256C | 4AD0 | 7AFF |
| 5 | | 9945 | 7F37 | 6E5F | 55C5 | 53DB | 4AF7 | 5916 | 6510 |
| 6 | | 80A2 | 80A0 | 849C | 9857 | A85B | B02F | A455 | 9870 |
| 7 | | 7EA6 | 6902 | 4D5F | 3D9B | 4266 | 5A69 | 73B1 | 85C6 |

FIGURE 17D

| p | 0 | | 1 | | 2 | | 3 | |
|---|---|---|---|---|---|---|---|---|
| r | 1 | 2 | 1 | 2 | 1 | 2 | 1 | 2 |
| q \ j | 1 | 2 | 3 | 4 | 5 | 6 | 7 | 8 |
| 0 | 8051 | 794B | 726B | 6175 | 7274 | 616F | 8055 | 7949 |
| 1 | 9AE3 | 93BE | B28B | A147 | B286 | A151 | 9AE2 | 93C1 |
| 2 | 7B6D | 54FB | 4BD1 | 2C95 | 263E | 3ACF | 55BA | 6341 |
| 3 | AE2A | AD31 | C685 | D00F | C6A7 | AD48 | AE4C | 8A4B |
| 4 | 6216 | 4505 | 29FE | 28A9 | 2A23 | 454E | 626F | 8A5C |
| 5 | 89E8 | 61A6 | 4436 | 2907 | 2791 | 2935 | 4491 | 6216 |
| 6 | 8461 | 8AA7 | 967B | ADF0 | BBE0 | BC66 | A9B9 | 9918 |
| 7 | 7C62 | 67AB | 4E60 | 4503 | 4E3E | 677E | 7C40 | 8A1B |

FIGURE 18

| | | p | 0 | | 1 | | 2 | | 3 | |
|---|---|---|---|---|---|---|---|---|---|---|
| | | r | 1 | 2 | 1 | 2 | 1 | 2 | 1 | 2 |
| q | r | j | 1 | 2 | 3 | 4 | 5 | 6 | 7 | 8 |
| 0 | 1 | 1 | 9D62 | 997B | B890 | AF21 | B887 | AF2C | 9D5F | 997E |
| | 2 | 2 | 97C8 | 8F11 | AB0D | 95FE | AB0A | 9606 | 97C7 | 8F13 |
| | 3 | 3 | 8C8B | 829F | 8FED | 77F6 | 8FF2 | 77F7 | 8C8D | 829F |
| | 4 | 4 | 8051 | 794B | 726B | 6175 | 7274 | 616F | 8055 | 7949 |
| 1 | 1 | 5 | 8CD2 | 960D | 9094 | A6DE | 908D | A6DF | 8CD0 | 960D |
| | 2 | 6 | 97FB | 9CEC | AB83 | B772 | AB79 | B77A | 97F7 | 9CEF |
| | 3 | 7 | 9D6B | 9C08 | B8A5 | B549 | B89B | B554 | 9D68 | 9C0B |
| | 4 | 8 | 9AE3 | 93BE | B28B | A147 | B286 | A151 | 9AE2 | 93C1 |
| 2 | 1 | 9 | AC89 | A7C5 | C013 | C67C | BC7F | A548 | A8F2 | 8674 |
| | 2 | 10 | 9FE6 | 89B7 | 99AC | 903D | 84E5 | 7B3E | 8B0C | 74A5 |
| | 3 | 11 | 8E22 | 6BC3 | 6F9D | 588F | 4E89 | 54B8 | 6CF0 | 67E9 |
| | 4 | 12 | 7B6D | 54FB | 4BD1 | 2C95 | 263E | 3ACF | 55BA | 6341 |
| 3 | 1 | 13 | 9C5E | C288 | CE26 | EE2C | F38D | DC95 | C1E6 | B0E2 |
| | 2 | 14 | AA6B | C9D6 | DF89 | FECC | FED7 | DFA4 | C9D5 | AA92 |
| | 3 | 15 | B0DB | C21D | DCC6 | F3E7 | EE98 | CE87 | C2BD | 9C9C |
| | 4 | 16 | AE2A | AD31 | C685 | D00F | C6A7 | AD48 | AE4C | 8A4B |
| 4 | 1 | 17 | 7AA0 | 4A52 | 24CB | 0B29 | 0A60 | 1643 | 3AAC | 6533 |
| | 2 | 18 | 6DA9 | 3CA4 | 14B6 | 0089 | 008B | 14E7 | 3CD9 | 6DF2 |
| | 3 | 19 | 650B | 3AC7 | 1689 | 0AE5 | 0BB3 | 256C | 4AD0 | 7AFF |
| | 4 | 20 | 6216 | 4505 | 29FE | 28A9 | 2A23 | 454E | 626F | 8A5C |
| 5 | 1 | 21 | AF18 | BA97 | C855 | BF2F | BD43 | A4C7 | 944D | 7AAC |
| | 2 | 22 | A655 | 9E73 | 9CC5 | 8881 | 886D | 765D | 7516 | 6DB3 |
| | 3 | 23 | 9945 | 7F37 | 6E5F | 55C5 | 53DB | 4AF7 | 5916 | 6510 |
| | 4 | 24 | 89E8 | 61A6 | 4436 | 2907 | 2791 | 2935 | 4491 | 6216 |
| 6 | 1 | 25 | 7BD9 | 6FD3 | 63CC | 6B74 | 7B6F | 8F46 | 9374 | 939A |
| | 2 | 26 | 7DB4 | 776C | 7737 | 8187 | 923E | A0B3 | 9CB0 | 968D |
| | 3 | 27 | 80A2 | 80A0 | 849C | 9857 | A85B | B02F | A455 | 9870 |
| | 4 | 28 | 8461 | 8AA7 | 967B | ADF0 | BBE0 | BC66 | A9B9 | 9918 |
| 7 | 1 | 29 | 85E0 | 73E0 | 5AAE | 429D | 3DB5 | 4D55 | 68F1 | 7E95 |
| | 2 | 30 | 81E8 | 6D32 | 5198 | 3CC8 | 3CB9 | 516F | 6D11 | 81D2 |
| | 3 | 31 | 7EA6 | 6902 | 4D5F | 3D9B | 4266 | 5A69 | 73B1 | 85C6 |
| | 4 | 32 | 7C62 | 67AB | 4E60 | 4503 | 4E3E | 677E | 7C40 | 8A1B |

FIGURE 19A

| q \ j | p | 0 | | 1 | | 2 | | 3 | |
|---|---|---|---|---|---|---|---|---|---|
| | r | 1 | 2 | 1 | 2 | 1 | 2 | 1 | 2 |
| | j | 1 | 2 | 3 | 4 | 5 | 6 | 7 | 8 |
| 0 | | 9D62 | 8CD2 | AC89 | 9C5E | 7AA0 | AF18 | 7BD9 | 85E0 |
| 1 | | 8CD2 | AC89 | 9C5E | 7AA0 | AF18 | 7BD9 | 85E0 | 9D62 |
| 2 | | AC89 | 9C5E | 7AA0 | AF18 | 7BD9 | 85E0 | 9D62 | 8CD2 |
| 3 | | 9C5E | 7AA0 | AF18 | 7BD9 | 85E0 | 9D62 | 8CD2 | AC89 |
| 4 | | 7AA0 | AF18 | 7BD9 | 85E0 | 9D62 | 8CD2 | AC89 | 9C5E |
| 5 | | AF18 | 7BD9 | 85E0 | 9D62 | 8CD2 | AC89 | 9C5E | 7AA0 |
| 6 | | 7BD9 | 85E0 | 9D62 | 8CD2 | AC89 | 9C5E | 7AA0 | AF18 |
| 7 | | 85E0 | 9D62 | 8CD2 | AC89 | 9C5E | 7AA0 | AF18 | 7BD9 |

FIGURE 19B

| q \ j | p | 0 | | 1 | | 2 | | 3 | |
|---|---|---|---|---|---|---|---|---|---|
| | r | 1 | 2 | 1 | 2 | 1 | 2 | 1 | 2 |
| | j | 1 | 2 | 3 | 4 | 5 | 6 | 7 | 8 |
| 0 | | 97C8 | 97FB | 9FE6 | AA6B | 6DA9 | A655 | 7DB4 | 81E8 |
| 1 | | 97FB | 9FE6 | AA6B | 6DA9 | A655 | 7DB4 | 81E8 | 97C8 |
| 2 | | 9FE6 | AA6B | 6DA9 | A655 | 7DB4 | 81E8 | 97C8 | 97FB |
| 3 | | AA6B | 6DA9 | A655 | 7DB4 | 81E8 | 97C8 | 97FB | 9FE6 |
| 4 | | 6DA9 | A655 | 7DB4 | 81E8 | 97C8 | 97FB | 9FE6 | AA6B |
| 5 | | A655 | 7DB4 | 81E8 | 97C8 | 97FB | 9FE6 | AA6B | 6DA9 |
| 6 | | 7DB4 | 81E8 | 97C8 | 97FB | 9FE6 | AA6B | 6DA9 | A655 |
| 7 | | 81E8 | 97C8 | 97FB | 9FE6 | AA6B | 6DA9 | A655 | 7DB4 |

FIGURE 19C

| q \ j | p | 0 | | 1 | | 2 | | 3 | |
|---|---|---|---|---|---|---|---|---|---|
| | r | 1 | 2 | 1 | 2 | 1 | 2 | 1 | 2 |
| | j | 1 | 2 | 3 | 4 | 5 | 6 | 7 | 8 |
| 0 | | 8C8B | 9D6B | 8E22 | B0DB | 650B | 9945 | 80A2 | 7EA6 |
| 1 | | 9D6B | 8E22 | B0DB | 650B | 9945 | 80A2 | 7EA6 | 8C8B |
| 2 | | 8E22 | B0DB | 650B | 9945 | 80A2 | 7EA6 | 8C8B | 9D6B |
| 3 | | B0DB | 650B | 9945 | 80A2 | 7EA6 | 8C8B | 9D6B | 8E22 |
| 4 | | 650B | 9945 | 80A2 | 7EA6 | 8C8B | 9D6B | 8E22 | B0DB |
| 5 | | 9945 | 80A2 | 7EA6 | 8C8B | 9D6B | 8E22 | B0DB | 650B |
| 6 | | 80A2 | 7EA6 | 8C8B | 9D6B | 8E22 | B0DB | 650B | 9945 |
| 7 | | 7EA6 | 8C8B | 9D6B | 8E22 | B0DB | 650B | 9945 | 80A2 |

FIGURE 19D

| | p | 0 | | 1 | | 2 | | 3 | |
|---|---|---|---|---|---|---|---|---|---|
| | r | 1 | 2 | 1 | 2 | 1 | 2 | 1 | 2 |
| q | j | 1 | 2 | 3 | 4 | 5 | 6 | 7 | 8 |
| 0 | | 8051 | 9AE3 | 7B6D | AE2A | 6216 | 89E8 | 8461 | 7C62 |
| 1 | | 9AE3 | 7B6D | AE2A | 6216 | 89E8 | 8461 | 7C62 | 8051 |
| 2 | | 7B6D | AE2A | 6216 | 89E8 | 8461 | 7C62 | 8051 | 9AE3 |
| 3 | | AE2A | 6216 | 89E8 | 8461 | 7C62 | 8051 | 9AE3 | 7B6D |
| 4 | | 6216 | 89E8 | 8461 | 7C62 | 8051 | 9AE3 | 7B6D | AE2A |
| 5 | | 89E8 | 8461 | 7C62 | 8051 | 9AE3 | 7B6D | AE2A | 6216 |
| 6 | | 8461 | 7C62 | 8051 | 9AE3 | 7B6D | AE2A | 6216 | 89E8 |
| 7 | | 7C62 | 8051 | 9AE3 | 7B6D | AE2A | 6216 | 89E8 | 8461 |

FIGURE 20A

| q | r | j | p=0 r=1 | p=0 r=2 | p=1 r=1 | p=1 r=2 | p=2 r=1 | p=2 r=2 | p=3 r=1 | p=3 r=2 |
|---|---|---|---|---|---|---|---|---|---|---|
| | | j | 1 | 2 | 3 | 4 | 5 | 6 | 7 | 8 |
| 0 | 1 | 1 | 9D62 | 8CD2 | 8CD2 | AC89 | AC89 | 9C5E | 9C5E | 7AA0 |
| | 2 | 2 | 97C8 | 97FB | 97FB | 9FE6 | 9FE6 | AA6B | AA6B | 6DA9 |
| | 3 | 3 | 8C8B | 9D6B | 9D6B | 8E22 | 8E22 | B0DB | B0DB | 650B |
| | 4 | 4 | 8051 | 9AE3 | 9AE3 | 7B6D | 7B6D | AE2A | AE2A | 6216 |
| 1 | 1 | 5 | 8CD2 | AC89 | AC89 | 9C5E | 9C5E | 7AA0 | 7AA0 | AF18 |
| | 2 | 6 | 97FB | 9FE6 | 9FE6 | AA6B | AA6B | 6DA9 | 6DA9 | A655 |
| | 3 | 7 | 9D6B | 8E22 | 8E22 | B0DB | B0DB | 650B | 650B | 9945 |
| | 4 | 8 | 9AE3 | 7B6D | 7B6D | AE2A | AE2A | 6216 | 6216 | 89E8 |
| 2 | 1 | 9 | AC89 | 9C5E | 9C5E | 7AA0 | 7AA0 | AF18 | AF18 | 7BD9 |
| | 2 | 10 | 9FE6 | AA6B | AA6B | 6DA9 | 6DA9 | A655 | A655 | 7DB4 |
| | 3 | 11 | 8E22 | B0DB | B0DB | 650B | 650B | 9945 | 9945 | 80A2 |
| | 4 | 12 | 7B6D | AE2A | AE2A | 6216 | 6216 | 89E8 | 89E8 | 8461 |
| 3 | 1 | 13 | 9C5E | 7AA0 | 7AA0 | AF18 | AF18 | 7BD9 | 7BD9 | 85E0 |
| | 2 | 14 | AA6B | 6DA9 | 6DA9 | A655 | A655 | 7DB4 | 7DB4 | 81E8 |
| | 3 | 15 | B0DB | 650B | 650B | 9945 | 9945 | 80A2 | 80A2 | 7EA6 |
| | 4 | 16 | AE2A | 6216 | 6216 | 89E8 | 89E8 | 8461 | 8461 | 7C62 |
| 4 | 1 | 17 | 7AA0 | AF18 | AF18 | 7BD9 | 7BD9 | 85E0 | 85E0 | 9D62 |
| | 2 | 18 | 6DA9 | A655 | A655 | 7DB4 | 7DB4 | 81E8 | 81E8 | 97C8 |
| | 3 | 19 | 650B | 9945 | 9945 | 80A2 | 80A2 | 7EA6 | 7EA6 | 8C8B |
| | 4 | 20 | 6216 | 89E8 | 89E8 | 8461 | 8461 | 7C62 | 3E98 | EE06 |
| 5 | 1 | 21 | AF18 | 7BD9 | 7BD9 | 85E0 | 85E0 | 9D62 | 9D62 | 8CD2 |
| | 2 | 22 | A655 | 7DB4 | 7DB4 | 81E8 | 81E8 | 97C8 | 97C8 | 97FB |
| | 3 | 23 | 9945 | 80A2 | 80A2 | 7EA6 | 7EA6 | 8C8B | 8C8B | 9D6B |
| | 4 | 24 | 89E8 | 8461 | 8461 | 7C62 | 3E98 | EE06 | 8051 | 9AE3 |
| 6 | 1 | 25 | 7BD9 | 85E0 | 85E0 | 9D62 | 9D62 | 8CD2 | 8CD2 | AC89 |
| | 2 | 26 | 7DB4 | 81E8 | 81E8 | 97C8 | 97C8 | 97FB | 97FB | 9FE6 |
| | 3 | 27 | 80A2 | 7EA6 | 7EA6 | 8C8B | 8C8B | 9D6B | 9D6B | 8E22 |
| | 4 | 28 | 8461 | 7C62 | 3E98 | EE06 | 8051 | 9AE3 | 9AE3 | 7B6D |
| 7 | 1 | 29 | 85E0 | 9D62 | 9D62 | 8CD2 | 8CD2 | AC89 | AC89 | 9C5E |
| | 2 | 30 | 81E8 | 97C8 | 97C8 | 97FB | 97FB | 9FE6 | 9FE6 | AA6B |
| | 3 | 31 | 7EA6 | 8C8B | 8C8B | 9D6B | 9D6B | 8E22 | 8E22 | B0DB |
| | 4 | 32 | 3E98 | EE06 | 8051 | 9AE3 | 9AE3 | 7B6D | 7B6D | AE2A |

FIGURE 20B

| | | | p | 4 | | 5 | | 6 | | 7 | |
|---|---|---|---|---|---|---|---|---|---|---|---|
| | | | r | 1 | 2 | 1 | 2 | 1 | 2 | 1 | 2 |
| q | r | i | j | 1 | 2 | 3 | 4 | 5 | 6 | 7 | 8 |
| 0 | 1 | 1 | | 7AA0 | AF18 | AF18 | 7BD9 | 7BD9 | 85E0 | 85E0 | 9D62 |
| | 2 | 2 | | 6DA9 | A655 | A655 | 7DB4 | 7DB4 | 81E8 | 81E8 | 97C8 |
| | 3 | 3 | | 650B | 9945 | 9945 | 80A2 | 80A2 | 7EA6 | 7EA6 | 8C8B |
| | 4 | 4 | | 6216 | 89E8 | 89E8 | 8461 | 8461 | 7C62 | 3E98 | EE06 |
| 1 | 1 | 5 | | AF18 | 7BD9 | 7BD9 | 85E0 | 85E0 | 9D62 | 9D62 | 8CD2 |
| | 2 | 6 | | A655 | 7DB4 | 7DB4 | 81E8 | 81E8 | 97C8 | 97C8 | 97FB |
| | 3 | 7 | | 9945 | 80A2 | 80A2 | 7EA6 | 7EA6 | 8C8B | 8C8B | 9D6B |
| | 4 | 8 | | 89E8 | 8461 | 8461 | 7C62 | 3E98 | EE06 | 8051 | 9AE3 |
| 2 | 1 | 9 | | 7BD9 | 85E0 | 85E0 | 9D62 | 9D62 | 8CD2 | 8CD2 | AC89 |
| | 2 | 10 | | 7DB4 | 81E8 | 81E8 | 97C8 | 97C8 | 97FB | 97FB | 9FE6 |
| | 3 | 11 | | 80A2 | 7EA6 | 7EA6 | 8C8B | 8C8B | 9D6B | 9D6B | 8E22 |
| | 4 | 12 | | 8461 | 7C62 | 3E98 | EE06 | 8051 | 9AE3 | 9AE3 | 7B6D |
| 3 | 1 | 13 | | 85E0 | 9D62 | 9D62 | 8CD2 | 8CD2 | AC89 | AC89 | 9C5E |
| | 2 | 14 | | 81E8 | 97C8 | 97C8 | 97FB | 97FB | 9FE6 | 9FE6 | AA6B |
| | 3 | 15 | | 7EA6 | 8C8B | 8C8B | 9D6B | 9D6B | 8E22 | 8E22 | B0DB |
| | 4 | 16 | | 3E98 | EE06 | 8051 | 9AE3 | 9AE3 | 7B6D | 7B6D | AE2A |
| 4 | 1 | 17 | | 9D62 | 8CD2 | 8CD2 | AC89 | AC89 | 9C5E | 9C5E | 7AA0 |
| | 2 | 18 | | 97C8 | 97FB | 97FB | 9FE6 | 9FE6 | AA6B | AA6B | 6DA9 |
| | 3 | 19 | | 8C8B | 9D6B | 9D6B | 8E22 | 8E22 | B0DB | B0DB | 650B |
| | 4 | 20 | | 8051 | 9AE3 | 9AE3 | 7B6D | 7B6D | AE2A | AE2A | 6216 |
| 5 | 1 | 21 | | 8CD2 | AC89 | AC89 | 9C5E | 9C5E | 7AA0 | 7AA0 | AF18 |
| | 2 | 22 | | 97FB | 9FE6 | 9FE6 | AA6B | AA6B | 6DA9 | 6DA9 | A655 |
| | 3 | 23 | | 9D6B | 8E22 | 8E22 | B0DB | B0DB | 650B | 650B | 9945 |
| | 4 | 24 | | 9AE3 | 7B6D | 7B6D | AE2A | AE2A | 6216 | 6216 | 89E8 |
| 6 | 1 | 25 | | AC89 | 9C5E | 9C5E | 7AA0 | 7AA0 | AF18 | AF18 | 7BD9 |
| | 2 | 26 | | 9FE6 | AA6B | AA6B | 6DA9 | 6DA9 | A655 | A655 | 7DB4 |
| | 3 | 27 | | 8E22 | B0DB | B0DB | 650B | 650B | 9945 | 9945 | 80A2 |
| | 4 | 28 | | 7B6D | AE2A | AE2A | 6216 | 6216 | 89E8 | 89E8 | 8461 |
| 7 | 1 | 29 | | 9C5E | 7AA0 | 7AA0 | AF18 | AF18 | 7BD9 | 7BD9 | 85E0 |
| | 2 | 30 | | AA6B | 6DA9 | 6DA9 | A655 | A655 | 7DB4 | 7DB4 | 81E8 |
| | 3 | 31 | | B0DB | 650B | 650B | 9945 | 9945 | 80A2 | 80A2 | 7EA6 |
| | 4 | 32 | | AE2A | 6216 | 6216 | 89E8 | 89E8 | 8461 | 8461 | 7C62 |

MODULATION/DEMODULATION APPARATUS USING MATRIX AND ANTI-MATRIX

This application is a U.S. national phase application of PCT International Application PCT/JP02/12460.

FIELD OF THIS INVENTION

Methods of the present invention use a carrier for which reflection is not substantially strong, the carrier being applied to a modulation and demodulation apparatus using quadrature magnitude modulation of a plurality of sub-carriers for transmission of digital data therebetween.

BACKGROUND

Typical methods for transmitting data use a number of sub-carriers which are modulated by quadrature magnitude modulation, and applied, for example, to QAM of digital cable TV, to DSL of a metal twist-pair, etc. These methods concentrate on the frequency of each carrier. These methods demodulate the signal by applying, for example, a digital filter or FFT and use an impulse response result as coefficients of a filter. For this reason it takes a comparatively long time to detect the amplitude of a carrier because the methods perform detection until there appears to be a same continuous wave form.

SUMMARY OF THE INVENTION

The present invention relates to a modulation and demodulation system. The system uses n sub-carrier frequencies and an oversampling positive integer and includes a modulation circuit and a demodulation circuit. The modulation circuit includes a modulation ROM that stores columns of elements independently in a modulation ROM matrix. The demodulation circuit includes 2n numbers of a ROM1 that stores elements of a combined matrix. The combined matrix is generated by combining a number of inverse matrices where the inverse matrices are generated from the modulation ROM.

BRIEF DESCRIPTION OF THE DRAWINGS

FIG. 10: is an example illustrating values stored as a modulation matrix.
FIGS. 11A-11E: are examples illustrating a method for generating demodulation matrices from the modulation matrix shown in FIG. 10.
FIGS. 12A and 12B: are examples of modulated data provided to a DA converter and modulated data received by a demodulation circuit.
FIGS. 13A-13D: are examples illustrating the mean value of the demodulation data and determined parameters of adjustment.
FIGS. 14A and 14B: are examples of modulated data for practical communication and the modulated data received by a demodulation circuit.
FIGS. 15A-15C: are examples illustrating demodulation of the modulated data shown in FIGS. 14A and 14B with application of determined adjustment parameters.
FIG. 16: is an example illustrating stored data in modulation ROM where the data of the modulation matrix is exchanged to positive Hex data.
FIGS. 17A-17D: are examples illustrating demodulation ROMS1-(1~4) where the data is exchanged to positive Hex data.
FIG. 18: is an example illustrating the combination of the four demodulation ROMS shown in FIGS. 17A-17D.
FIGS. 19A-19D: are examples illustrating respective demodulation ROM2-(1~4) for synchronization.
FIGS. 20A and 20B: are examples illustrating demodulation ROM2 that are combined ROM for synchronization.

DETAILED DESCRIPTION OF THE INVENTION

Figure 1:
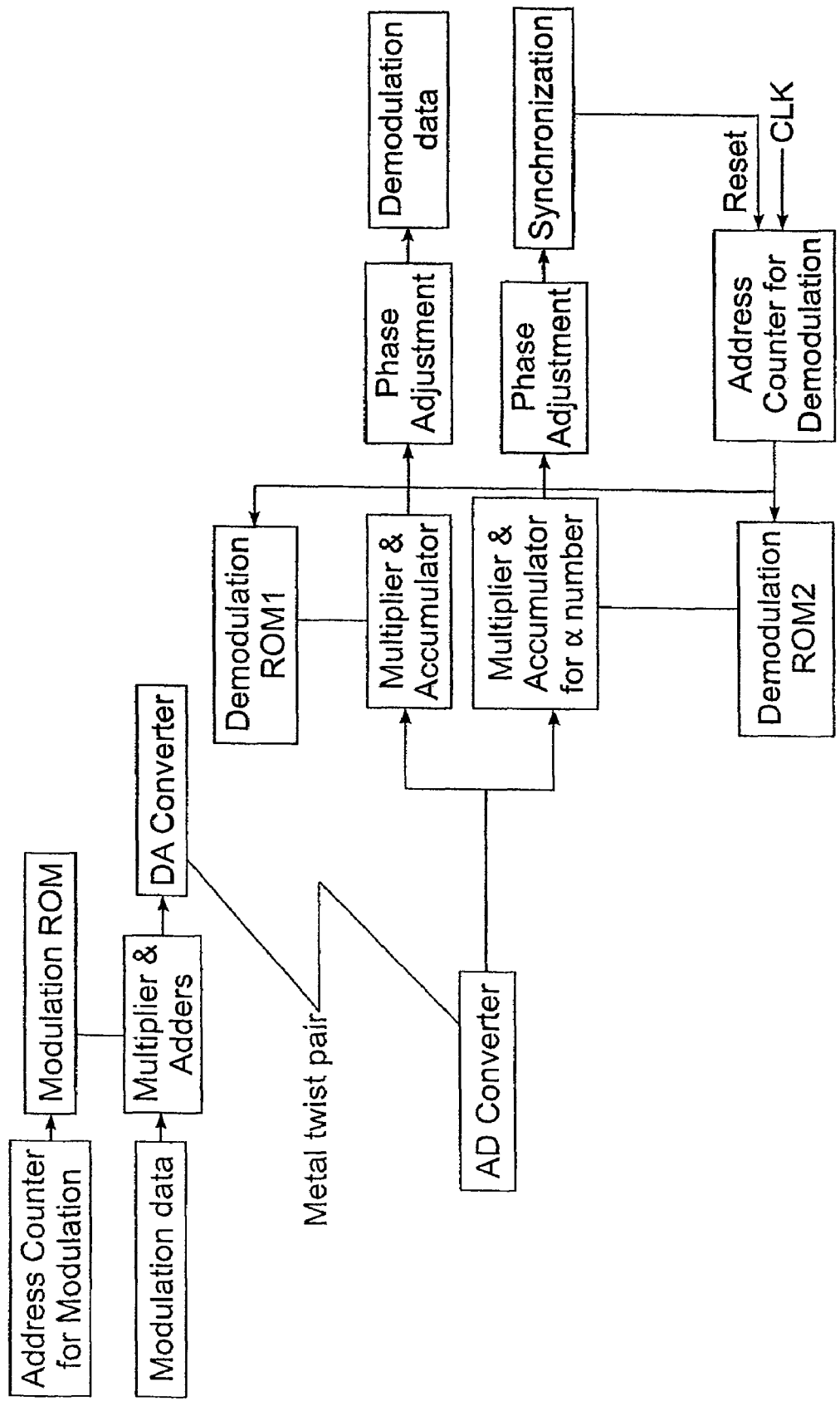
FIG. 1: Modulation and demodulation total system block diagram.

To detect accurate results from a modulated signal, a demodulation circuit, such as a digital filter or an FFT, concentrates independently on the frequency of each sub-carrier and increases the number of waveforms, also causing difficulty with the transmission speed. In order to provide a high transmission speed, for example, the number of carriers is increased to reach a high frequency, so as to greatly decrease the transmission distance.

According to aspects of the present invention, the demodulation circuit does not concentrate independently on the frequency of each sub-carrier but, instead, analyzes the modulated data consisting of an amount of quadrature amplitude modulation of each sub-carrier. Construction of the modulated data is seen as simultaneous linear equations defining an unknown amplitude of each sub-carrier. The amplitude of each sub-carrier is determined by solving the simultaneous linear equations. Because simultaneous linear equations can be solved when the number of unknown variables is equal to the number of each equation, ideally, thus the number of data may be exchanged by an equal number of modulated data. According to the present invention, a circuit method uses simultaneous linear equations that are solved in modulation and demodulation circuits.

Determine of an amount of quadrature modulation of a plurality of sub-carriers is described below using matrix mathematics.

A square matrix is constructed of an equal number of rows and columns that is two times a number of sub-carrier frequencies and uses sine and cosine waves that are each a function of one frequency. The elements of the matrix, defined herein as a modulation matrix, are values of a trigonometric function. A row (i.e., a line) of the modulation matrix corresponds to a number of sampling for which the interval is equal to a DA converter frequency. A column of the modulation matrix corresponds to a sub-carrier which is sine or cosine of a carrier frequency. The product of this modulation matrix and a modulation data matrix (the modulation data matrix being one column and responding to each sub-carrier) is determined and is converted by a DA converter to an analog output, respectively. The rows of the modulation matrix are arranged according to a DA converting number and is the sine or cosine value of the carrier frequency. The product of this modulation matrix and the one column modulation data matrix provides a sum of the product of the sine or cosine value at every row and the modulation data specified to the sub-carrier, and becomes modulated data for the DA converter input of every interval. Thus, quadrature modulation is described as simultaneous linear equations.

From the view of the demodulation side about this equation, the modulated data is the received data detected by AD converter, where the modulation data is unknown. As there are unknown modulation data of two times the number of kinds of carrier frequency, a number of equations are formed corresponding to two times the number of carrier frequencies. Therefore the simultaneous linear equations can be solved. At the demodulation side, the sampling frequency of the AD converter is adjusted to the sampling frequency of the DA converter of the modulation side, and similar data as modulated data is obtained from AD converter. The demodulated data is obtained from the product of received data matrix from the AD converter and an inverse matrix of modulation matrix (defined herein as the demodulation matrix). In addition, over-sampling is implemented. A number of over-sampling modulation matrices are generated, and a number of demodulation matrices, which are the inverse matrix of modulation matrix, are formed as the number of over-sampling demodulation matrices. The over-sampling modulation matrix is composed by inserting each row in an over-sampling order position, and the over-sampling demodulation matrix is composed by a similar method of insertion. When modulation uses this over-sampling modulation matrix and demodulation uses this over-sampling demodulation matrix, then an over-sampling number times the demodulated data is obtained. When modulation uses this over-sampling modulation matrix and demodulation uses individual inverse matrices, then the same numbers of over-sampling demodulated data are obtained.

Next, the above theory is described using mathematical equations.

The modulation matrix includes:
row number: i i=1~2 α n
column number: j j=1~2 n where:
number of carrier frequency: n
number of over-sampling: α

For over-sampling:
carrier frequency number: p p=0~(n−1)
original sampling order (without over-sampling): q q=0~(2n−1)
order of over-sampling: r r=1~α

In addition, a type of wave: s s=1 indicate cosine wave s=2 indicate sine wave Relationships between the above parameters to row number i and column number j are shown as:
i=αq+r q=0~(2n−1) r=1~α therefore i=1~2αn
j=2p+s p=0~(n−1) s=1 or 2 therefore j=1~2 n The element of row number i and column number j is Fj(i) and is defined as:

$$F_j(i) = F_{2p+s}(\alpha q + r)$$

where
frequency of frequency number p: f p
angle velocity of frequency number p: ωp
number of original sampling in one complete wave form: ρ
interval time of over-sampling: $T_s$ $$\omega_p = 2\pi f_p$$

$$T_s = \frac{1}{\rho \times \alpha \times f_0}$$

and, the angle of sine and cosine in the element of row number i is:

$$\omega_p \times T_s \times i = \frac{2\pi f_p}{\rho \times \alpha \times f_0} \times (\alpha q + r)$$

Therefore, the element of modulation matrix $F_j(i)$ is described as:

$$F_j(i) = F_{2p+s}(\alpha q + r) = \cos\left\{\frac{2\pi fp}{\rho \times \alpha \times f_0} \times (\alpha q + r)\right\} \text{ In case of } s = 1$$

$$= \sin\left\{\frac{2\pi fp}{\rho \times \alpha \times f_0} \times (\alpha q + r)\right\} \text{ In case of } s = 2$$

The size of the modulation matrix is 2αn rows and 2n columns.

The size of the modulation matrix is 2αn lines and 2n columns.

The size of the modulation data matrix is 2n lines and one column, where each element is described as $x_j$ because the line number of the modulation data matrix is related to the column number of the modulation matrix, to relate each modulation data to the sub-carrier of sine and cosine individually. The equation of quadrature modulation is described as the product of the modulation matrix and the modulation data matrix. The size of modulated data matrix, which is the product of the modulation matrix and the modulation data matrix, is 2αn lines and one column, and the element of modulated data matrix is described as $d_i$ according to the line number of modulation matrix. As the element of modulated data matrix $d_i$ is the amount of quadrature modulation of each sub-carrier at every sampling time, the equation of modulation is described by a matrix as:

$$(F_j(i)) \times (x_j) = (d_i)$$

and this equation is described by elements as:

$$\begin{pmatrix} F_1(1), F_2(1), F_3(1), \cdots F_{2n-1}(1), F_{2n}(1), \\ F_1(2), F_2(2), F_3(2), \cdots F_{2n-1}(2), F_{2n}(2), \\ F_1(3), F_2(3), F_3(3), \cdots F_{2n-1}(3), F_{2n}(3), \\ \vdots \\ F_1(2\alpha n), F_2(2\alpha n), F_3(2\alpha n), \cdots F_{2n-1}(2\alpha n), F_{2n}(2\alpha n), \end{pmatrix} \times \begin{pmatrix} x_1 \\ x_2 \\ \vdots \\ x_j \\ \vdots \\ x_{2n} \end{pmatrix} = \begin{pmatrix} d_1 \\ d_2 \\ \vdots \\ d_i \\ \vdots \\ d_{2\alpha n} \end{pmatrix}$$

This equation of modulation is described by simultaneous linear equations as:

$$F_1(1)x_1 + F_2(1)x_2 + F_3(1)x_3 + \ldots + F_{2n-1}(1)x_{2n-1} + F_{2n}(1)$$
$$x_{2n} = d_1$$

$$F_1(2)x_1 + F_2(2)x_2 + F_3(2)x_3 + \ldots + F_{2n-1}(1)x_{2n-1} + F_{2n}(2)$$
$$x_{2n} = d_2$$

$$F_1(3)x_1 + F_2(3)x_2 + F_3(3)x_3 + \ldots + F_{2n-1}(3)x_{2n-1} + F_{2n}(3)$$
$$x_{2n} = d_3$$

.

.

.

$$F_1(2\alpha n)x_1+F_2(2\alpha n)x_2+F_3(2\alpha n)x_3+\ldots +F_{2n-1}(2\alpha n)$$
$$x_{2n-1}+F_{2n}=d_{2\alpha n}$$

Depending on the simultaneous linear equations, the product of initially determined $F_j(i)$ and modulation data $x_i$ related by j, are summed together through all j, resulting in $d_i$ as the input data to the DA converter at sampling number i, which is converted to an analog output. The input data $d_i$ can be obtained by multiplying and accumulating in every sampling interval.

The receiving side is next described. The matrix of which elements $(F_{r0,2p+s}(q))$ are obtained from the modulation matrix by implementing the over-sampling order number $r=r_0$, is represented as:

$$F_{r0,2p+s}(q) = \cos\left\{\frac{2\pi f_p}{\rho \times \alpha \times f_0} \times (\alpha q + r_0)\right\} \text{ in case of } s=1$$
$$\sin\left\{\frac{2\pi f_p}{\rho \times \alpha \times f_0} \times (\alpha q + r_0)\right\} \text{ in case of } s=2$$
$$q = 0 \sim (2n-1)$$

The first line of this matrix is the first $r_0$ line of modulation matrix, and the other line is obtained from the modulation matrix every $\alpha$ line from $r_0$ to construct 2n lines.

The first line of the related modulated data matrix is the first $r_0$ line of the modulated data matrix and the other line is obtained from the modulated data matrix every $\alpha$ line from $r_0$ to construct 2n lines, and of which element $d_{r0,q}$ is described as:

$$d_{r0,q}=d(\alpha q+r_0)$$

The modulation equation of the above matrix obtained by sampling order $r_0$ is described in matrix form as:

$$(F_{r0,2p+s}(q))\times(x_{2p+s})=(d_{r0,q})$$

This above equation is described by elements as:

$$\begin{pmatrix} F_{r0,1}(0), F_{r0,2}(0), F_{r0,3}(0), \cdots F_{r0,2n-1}(0), F_{r0,2n}(0) \\ F_{r0,1}(1), F_{r0,2}(1), F_{r0,3}(1), \cdots F_{r0,2n-1}(1), F_{r0,2n}(1) \\ \vdots \\ F_{r0,1}(2n-1), F_{r0,2}(2n-1), F_{r0,3}(2n-1), \cdots \\ F_{r0,2n-1}(2n-1), F_{r0,2n}(2n-1), \end{pmatrix} \times \begin{pmatrix} x_1 \\ x_2 \\ \vdots \\ x_j \\ \vdots \\ x_{2n} \end{pmatrix} = \begin{pmatrix} d_{r0,0} \\ d_{r0,1} \\ \vdots \\ \vdots \\ d_{r0,2\alpha n} \end{pmatrix}$$

The above equation is described by simultaneous linear equations as:

$$F_{r0,1}(0)x_1+F_{r0,2}(0)x_2+F_{r0,3}(0)x_3+\ldots F_{r0,2n-1}(0)x_{2n-1}+F_{r0,2n}(0)x_{2n}=d_{r0,0}$$

$$F_{r0,1}(1)x_1+F_{r0,2}(1)x_2+F_{r0,3}(1)x_3+\ldots F_{r0,2n-1}(1)x_{2n-1}+F_{r0,2n}(1)x_{2n}=d_{r0,1}$$

.
.
.

$$F_{r0,1}(2n-1)x_1+F_{r0,2}(2n-1)x_2+F_{r0,3}(2n-1)x_3+\ldots F_{r0,2n-1}(2n-1)x_{2n-1}+F_{r0,2n}(2n-1)x_{2n}=d_{r0,2n-1}$$

In these simultaneous linear equations, $d_{r0,0} \sim d_{r0,2n-1}$ are similarly obtained as receiving data by an AD converter. For the demodulation side to detect the modulation data $x_1 \sim x_{2n}$, the inverse matrix of the modulation matrix of which element is $(F_{r0,2p+s}(q))$ is applied to solving these simultaneous linear equations. The elements of the inverse matrix of the modulation matrix is described as $G_{r0,j}(q)$.

Mathematically, the size of the receiving data matrix is one column matrix. Regarding the construction of the inverse matrix, the line number relates to the column number of the modulation matrix, and the column number relates to the line number of the modulation matrix such that it appears to be a suffix exchange of the line and the column. Therefore:

$$\begin{pmatrix} G_{r0,1}(0), G_{r0,2}(0), G_{r0,3}(0), \cdots G_{r0,2n-1}(0), G_{r0,2n}(0) \\ G_{r0,1}(1), G_{r0,2}(1), G_{r0,3}(1), \cdots G_{r0,2n-1}(1), G_{r0,2n}(1) \\ \vdots \\ G_{r0,1}(2n-1), G_{r0,2}(2n-1), G_{r0,3}(2n-1), \cdots \\ G_{r0,2n-1}(2n-1), G_{r0,2n}(2n-1), \end{pmatrix} \times \begin{pmatrix} d_{r0,0} \\ d_{r0,1} \\ \vdots \\ d_{r0,2n-1} \end{pmatrix} =$$

$$\begin{pmatrix} x_1 \\ x_2 \\ \vdots \\ x_{2n} \end{pmatrix}$$

This equation is described by simultaneous linear equations as:

$$G_{r0,1}(0)d_{r0,0}+G_{r0,1}(1)d_{r0,1}+G_{r0,1}(2)d_{r0,2}+\ldots G_{r0,1}(2n-2)d_{r0,2n-2}+G_{r0,1}(2n-1)d_{r0,2n-1}=x_1$$

$$G_{r0,2}(0)d_{r0,0}+G_{r0,2}(1)d_{r0,2}+G_{r0,2}(2)d_{r0,2}+\ldots G_{r0,2}(2n-2)d_{r0,2n-2}+G_{r0,2}(2n-1)d_{r0,2n-1}=x_2$$

$$G_{r0,2n}(0)d_{r0,0}+G_{r0,2n}(1)d_{r0,1}+G_{r0,2n}(2)d_{r0,2}+G_{r0,2n}(2n-2)d_{r0,2n-2}+G_{r0,2n}(2n-1)d_{r0,2n-1}=x_2n$$

According to these simultaneous linear equations, the inverse matrix of the matrix, which is obtained by the same over-sampling number line from the over-sampling modulation matrix, and the received data from the AD converter at every $r_0$ sampling interval, are multiplied and summed together by two times the number of carrier frequency accumulators, continuously until the end of one frame of modulation. Then the demodulated data of all sub-carriers are obtained.

As the number of over-sampling is $\alpha$, a number of $\alpha$ inverse matrices are generated from the modulation matrix and the number of $\alpha$ types of demodulated data are obtained by this operation. When demodulation starts from the first line of demodulation matrix synchronized to the received data of the first line of modulation matrix, $\alpha$ types of demodulated data are equal one after another because there is only one type of modulation data. When demodulation starts from several sampling later than the first line of the demodulation matrix but not over $\alpha$ sampling, the number of the same demodulation data decreases according to the number of the several sampling delay. When demodulation starts from over a sampling after the first line of demodulation matrix, no same demodulation data is obtained because the one frame time belonging to the one operation of the demodulation matrix is spread to a two frame time belonging to first modulated data matrix and the next modulated data matrix. Thus, the received data is constructed by the first modulation data and the next modulation data. This property is applied to synchronization of modulation and demodulation. The matrix is created where each column is picked up from one column of demodulation matrix and is constructed from another other column by shifting one over-sampling interval from each other to the end of the line number of demodulation matrix. The demodulation operation is applied to any received data from the AD converter by this shifted matrix, and a synchronization point is found by the column numbers of the same demodulated data.

The meaning of demodulation, which uses the matrix composed of lines from the over-sampling number of inverse matrices placed at a proper over-sampling timing under the condition of synchronizing with modulation, is that there are an over-sampling number of simultaneous linear equations, and an over-sampling number of same modulated data are solved. The products of the over-sampling demodulation matrix and the receiving data matrix from the AD converter are summed together, and an over-sampling number times of similar modulated data are obtained, contributing to a reduction of electrical circuits of multipliers and accumulators.

Next an adjusting method is described.

Distortion is generated by parameters of a communication line such as a twist-pair between terminals, and/or is generated by a sampling timing difference between the DA converter and the AD converter. The distortion should be adjusted to obtain the correct demodulated data. Before practical communication is performed, using decided parameters of the communication line or DA or AD converter, test communication is done to get adjust the parameters.

Modulation data of sub-carrier frequency number p are $x_{2p+1}$ for cosine and $x_{2p+2}$ for sine. The phase of these waves are shifted by $\theta_p$ in the receiving data by the parameter of communication line or a sampling timing difference of DA and AD converter.

The phase shifted form of the wave is described below as:

$$x_{2p+1}\cos(\omega_p t+\theta_p)=x_{2p+1}\cos\theta_p\cos\omega_p t-x_{2p+1}\sin\theta_p\sin\omega_p t$$

$$x_{2p+2}\cos(\omega_p t+\theta_p)=x_{2p+2}\cos\theta_p\cos\omega_p t-x_{2p+2}\sin\theta_p\sin\omega_p t$$

On the demodulation side, the amount of these waves is obtained as the received data. Practical demodulated data $\beta_{2p+1}$ for cosine and $\beta_{2p+2}$ for sine, which is demodulated by the operation of the received data and the demodulation matrix about cosine and sine independently, are obtained as coefficients of $\cos\omega_p t$ and $\sin\omega_p t$. Practical demodulated data is described mathematically as:

$$\beta_{2P+1}=x_{2p+1}\cos\theta_p+x_{2p+2}\sin\theta_p$$

$$\beta_{2P+2}=x_{2p+1}\sin\theta_p+x_{2p+2}\cos\theta_p$$

The practical demodulated data of each sampling index r are described as $\beta_{r,2p+1}$ and $\beta_{r,2p+2}$, which is detected by the operation of the partial demodulation matrix and the partial receiving data matrix of each sampling index. This demodulated data are described by use of a raff equal symbol because of being distorted by noise and a phase shift. The equation for the demodulated data is described as:

$$\beta_{r,2p+1}\approx x_{2p+1}\cos\theta_p+x_{2p+2}\sin\theta_p$$

$$\beta_{r,2p+2}\approx x_{2p+1}\sin\theta_p+x_{2p+2}\cos\theta_p$$

A difference is determined regardless of the raff equal symbol. An amount of a square of the difference is described as $\delta_p^2$ and is differentiated by $\theta_p$ to apply minimum square method.

$$\frac{\partial}{\partial\theta_p}\delta_p^2 = 2(x_{2p+1}\sin\theta_p - x_{2p+2}\cos\theta_p)\sum_{r=1}^{\alpha}\beta_{r,2p+1} + $$
$$2(x_{2p+1}\cos\theta_p + x_{2p+2}\sin\theta_p)\sum_{r=1}^{\alpha}\beta_{r,2p+2}$$

The modulation data of the test communication before practical communication is described as:

$$x_{2p+1}=x_{2p+2}=x_{test}\neq 0$$

To obtain $\theta_p$, the minimum square method is applied as:

$$\frac{\partial}{\partial\theta_p}\delta_p^2 = 0$$

and $\theta_p$ is determined as:

$$\tan\theta_p = \frac{\sum_{r=1}^{\alpha}\beta_{r,2p+1} - \sum_{r=1}^{\alpha}\beta_{r,2p+2}}{\sum_{r=1}^{\alpha}\beta_{r,2p+1} + \sum_{r=1}^{\alpha}\beta_{r,2p+2}}$$

where $\cos\theta_p$ or $\sin\theta_p$ is calculated by $\tan\theta_p$.

The modulation data is determined as the mean value of the over-sampling number of the practical demodulation data, such that:

$$x_{2p+1} \cong \cos\theta_p \times \left\{\frac{1}{\alpha}\sum_{r=1}^{\alpha}\beta_{r,2p+1}\right\} - \sin\theta_p\left\{\frac{1}{\alpha}\sum_{r=1}^{\alpha}\beta_{r,2p+2}\right\}$$

$$x_{2p+2} \cong \sin\theta_p \times \left\{\frac{1}{\alpha}\sum_{r=1}^{\alpha}\beta_{r,2p+1}\right\} + \cos\theta_p\left\{\frac{1}{\alpha}\sum_{r=1}^{\alpha}\beta_{r,2p+2}\right\}$$

The modulation data $x_{test}$ is already known before the practical communication at the receiving side and is described below.

In column number 2p+1, $$x_{test}\approx \cos\theta_p \times \overline{D}_{2p+1}(\text{test}) - \sin\theta_p \times \overline{D}_{2p+2}(\text{test})$$

In column number 2p+2, $$x_{test}\approx \sin\theta_p \times \overline{D}_{2p+1}(\text{test}) - \cos\theta_p \times \overline{D}_{2p+2}(\text{test})$$

In these equations:

$$\overline{D}_{2p+1} = \frac{1}{\alpha}\sum_{r=1}^{\alpha}\beta_{r,2p+1}$$

$$\overline{D}_{2p+2} = \frac{1}{\alpha}\sum_{r=1}^{\alpha}\beta_{r,2p+2}$$

$\overline{D}$ followed by (test) denotes the practical demodulated data in the test communication and the mean value of $\alpha$ demodulated data.

The demodulated data differs from the modulation data on the demodulation side, and is adjusted according to an equality of a ratio of the amplitude of the test communication and the practical communication. An adjustment equation is shown as:

$$x_{2p+1} \to \frac{x_{test} \times (\cos\theta_p \times \overline{D}_{2p+1} - \sin\theta_p \overline{D}_{2p+2})}{\cos\theta_p \times \overline{D}_{2p+1}(\text{test}) - \sin\theta_p \times \overline{D}_{2p+2}(\text{test})}$$

$$x_{2p+2} \to \frac{x_{test} \times (\sin\theta_p \times \overline{D}_{2p+1} + \cos\theta_p \overline{D}_{2p+2})}{\sin\theta_p \times \overline{D}_{2p+1}(\text{test}) + \cos\theta_p \times \overline{D}_{2p+2}(\text{test})}$$

Therefore demodulation data is adjusted from such influence as the communication line.

FIG. 1 is a block diagram of a total system of modulation and demodulation. On the modulation side, the data of the modulation matrix, read only memory (ROM), for which an address is specified by the address counter for modulation, and the modulation data are multiplied in response to cosine and sine of all individual sub-carrier frequencies. The product is provided to the data of DA converter.

On the demodulation side, the analog signal is converted by the AD converter to a digital signal and is multiplied with the data of demodulation matrix ROM1, for which an address is specified by the address counter for demodulation, about cosine and sine of all individual sub-carrier frequencies in every sampling interval. The results of the multiplication are accumulated until the end of one modulation block, and adjusted every end of block about a phase shift to the adjusted demodulated data.

Regarding the synchronization between the address counter for modulation and the address counter for demodulation, ROM2 obtains the memory data belonging to one carrier frequency from the demodulation ROM1, and the data of the other block of memory are moved by some address each other to the end of memory address. The received data from the AD converter is multiplied and accumulated with the memory data of cosine and sine individually in numbers of shift, and, at the end of one modulation block, is adjusted about the phase shift and sent to the synchronization circuit.

In the synchronization circuit, the demodulated data is arranged according to the order of address shift, and the first data of a same data series nearly as α is determined. The address counter is reset for demodulation, adjusting the delay between the address counter and the number of shift.

Figure 2:
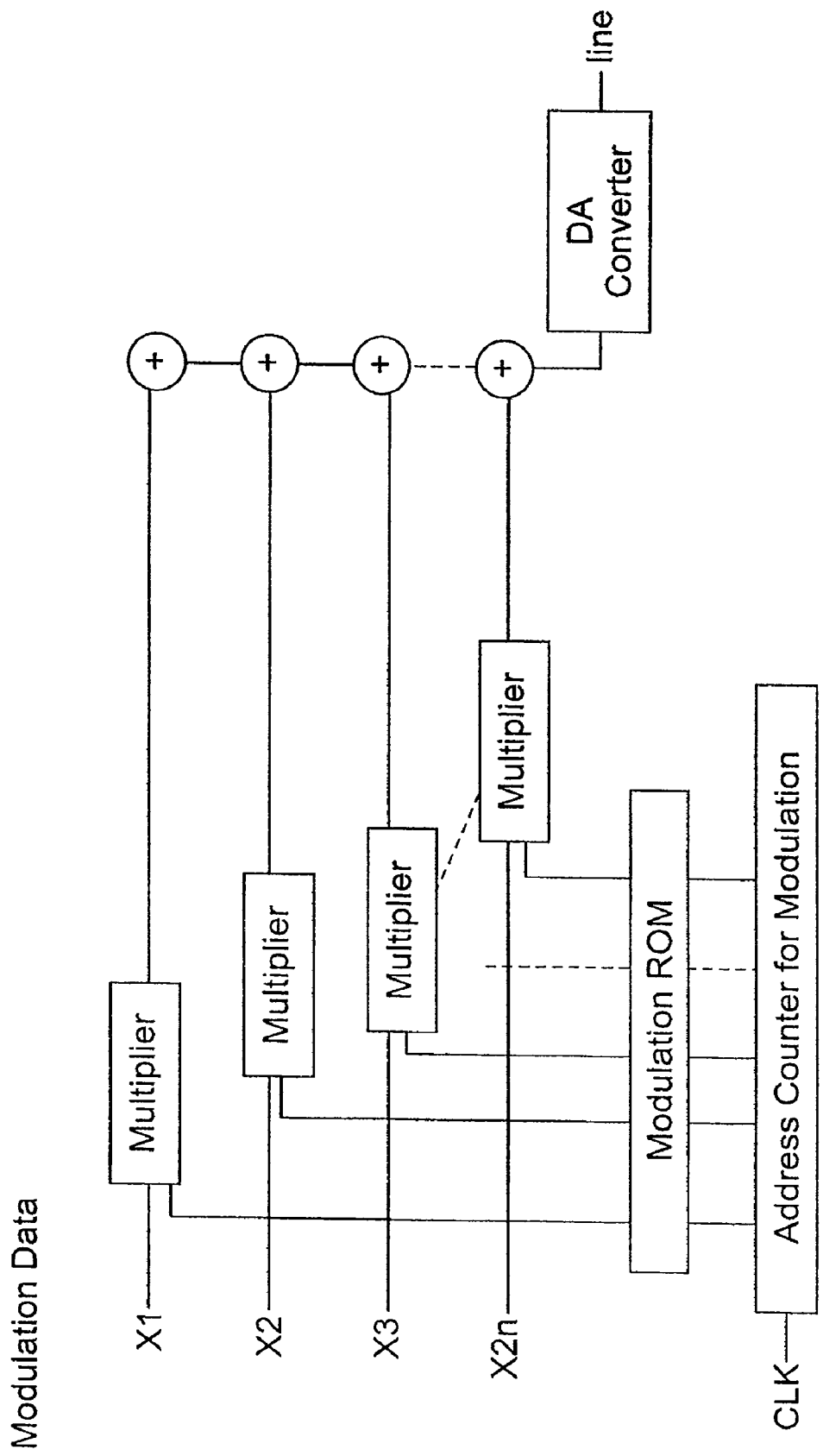
FIG. 2: Block diagram of modulation.

FIG. 2 is a block diagram of modulation. The maximum number of address counter for modulation is 2 α n. The address of the modulation ROM is 2 α n wide and the number of the data bus is 2nW(word) wide. 1W of modulation ROM stores Fj(i). This ROM sends the data of 2nW wide corresponding to i, which is specified as the index of sampling, to the modulation data of 2n. In every clock, the product of each modulation data and the specified Fj(i) of 1W wide are summed together for all numbers of modulation data and is converted by DA converter to analog to the communication line. Before the practical communication, a test communication is made using modulation data $x_{test}$.

Figure 3:
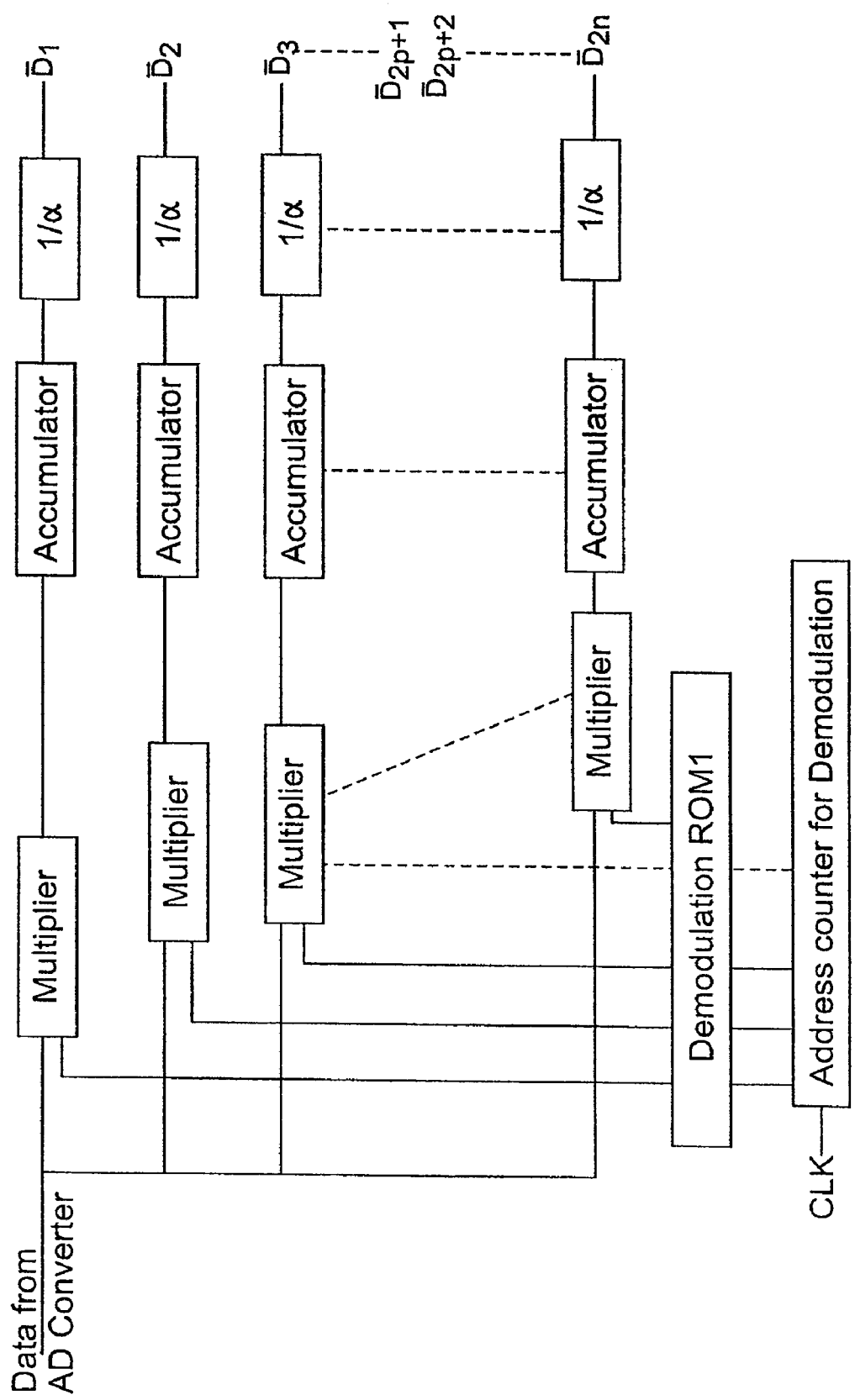
FIG. 3: Block diagram of demodulation.

FIG. 3 is a block diagram of demodulation used to obtain the demodulated data before adjustment of the phase. A maximum address of the address counter for demodulation is 2 α n. The address of demodulation ROM1 is 2 α n wide with data being 2nw wide (number of 2n of 1W wide ROM). The data of 1W of demodulation ROM1 is specified as G,j(i). The analog signal from the communication line is converted to digital by the AD converter at same sampling interval as the clock of the DA converter on modulation side.

2nW wide data is read out from demodulation ROM1 at every clock, and every 1W related to cosine or sine of subcarrier frequency, individually, is multiplied with the received data at this moment, and is individually accumulated until the number of 2 α n, and is divided by α as the demodulated data $\overline{D}_{2p+1}, \overline{D}_{2p+2}$ before adjustment of phase.

Figure 4:
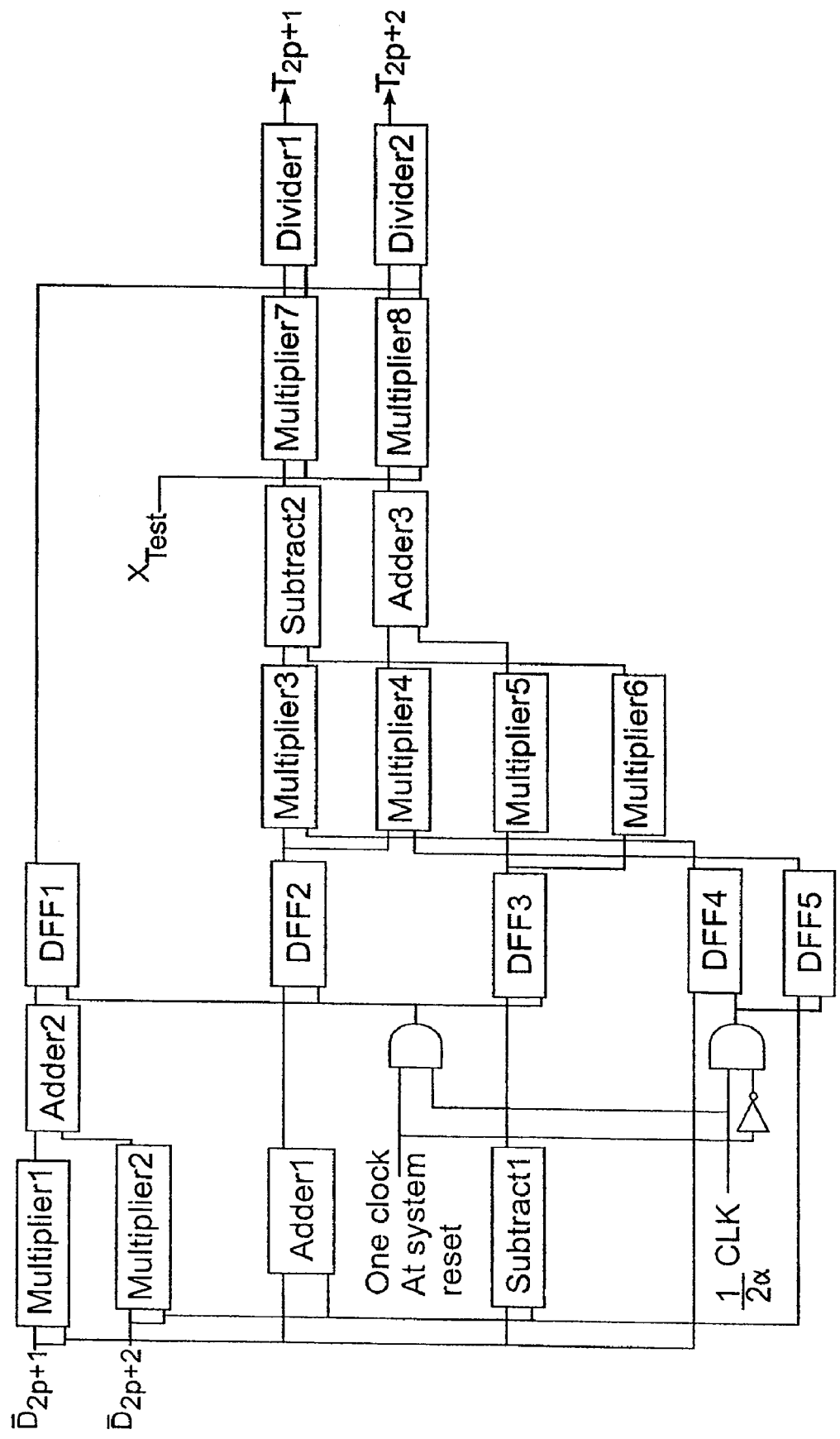
FIG. 4: Block diagram of phase and magnitude adjustment.

Using the mean value of demodulated data of cosine and sine of a same carrier of number p as $\overline{D}_{2p+1}, \overline{D}_{2p+2}$ drawn in FIG. 3 block diagram, FIG. 4 shows the adjustment circuit diagram of phase and magnitude.

Regarding the basic circuit operation in FIG. 4, the parameter of adjustment is set when the system is reset or when the parameter of adjustment changes according a condition of the communication line, by modulation data $x_{test}$ which is determined at an initial test communication by both the modulation side and the demodulation side. After this operation, practical communication begins and uses this parameter for adjustment calculation.

The mean value of demodulation data $\overline{D}_{2p+1}$ and $\overline{D}_{2p+2}$ are squared by blocks of multiplyer1 and multiplyer2, are added to each other by adder2 and are stored by data flip-flop (DFF)1 at the end of the initial test communication after system reset. This data is sent to DFF1, DFF2 and DFF3 at only one time after the initial test communication by one clock in the transmission unit frame time as 2 n α as numbers conversions of DA and AD, and stored until next reset after first one. By a similar operation, the added value of $\overline{D}_{2p+1}$ and $\overline{D}_{2p+2}$ is stored in DFF2 and a difference value of $\overline{D}_{2p+1}$ and $\overline{D}_{2p+2}$ is stored in DFF3. These three stored data and $x_{test}$ of initial test data of communication are stored as the parameter of adjustment until a next system reset.

The parameter of adjustment for multiplier.7 and multiplier.8 are:

$x_{test}$ data stored in DFF1 $\overline{D}_{2p+1}{}^2(\text{test}) + \overline{D}_{2p+2}{}^2(\text{test})$ data stored in DFF2 $\overline{D}_{2p+1}(\text{test}) + \overline{D}_{2p+2}(\text{test})$ data stored in DFF3 $\overline{D}_{2p+1}(\text{test}) - \overline{D}_{2p+2}(\text{test})$ In practical communication after the initial test communication, the mean value of the demodulated data in every one frame $\overline{D}_{2p+1}$ is stored in DFF4 and $\overline{D}_{2p+2}$ is stored in DFF5 and is renewed at the interval of 2 α number of the clock.

Stored data in some of the operation blocks are:

| | |
|---|---|
| $(\overline{D}_{2p+1}(\text{test}) + \overline{D}_{2p+2}(\text{test})) \times \overline{D}_{2p+1}$ | multiplier.3 |
| $(\overline{D}_{2p+1}(\text{test}) + \overline{D}_{2p+2}(\text{test})) \times \overline{D}_{2p+2}$ | multiplier.4 |
| $(\overline{D}_{2p+1}(\text{test}) - \overline{D}_{2p+2}(\text{test})) \times \overline{D}_{2p+1}$ | multiplier.5 |
| $(\overline{D}_{2p+1}(\text{test}) - \overline{D}_{2p+2}(\text{test})) \times \overline{D}_{2p+2}$ | multiplier.6 | and

| | |
|---|---|
| $(\overline{D}_{2p+1}(\text{test}) + \overline{D}_{2p+2}(\text{test})) \times \overline{D}_{2p+1} - (\overline{D}_{2p+1}(\text{test}) - \overline{D}_{2p+2}(\text{test})) \times \overline{D}_{2p+2}$ | difference.2 |
| $(\overline{D}_{2p+1}(\text{test}) + \overline{D}_{2p+2}(\text{test})) \times \overline{D}_{2p+2} + (\overline{D}_{2p+1}(\text{test}) - \overline{D}_{2p+2}(\text{test})) \times \overline{D}_{2p+1}$ | adder.3 |

Modulation data in test communication $x_{test}$ is determined by:

$$x_{test} \times \left\{ \begin{array}{l} (\overline{D}_{2p+1}(\text{test}) + \overline{D}_{2p+2}(\text{test})) \times \overline{D}_{2p+1} - \\ (\overline{D}_{2p+1}(\text{test}) - \overline{D}_{2p+2}(\text{test})) \times \overline{D}_{2p+2} \end{array} \right\} \quad \text{multiplier 7}$$

$$x_{test} \times \left\{ \begin{array}{l} (\overline{D}_{2p+1}(\text{test}) + \overline{D}_{2p+2}(\text{test})) \times \overline{D}_{2p+2} + \\ (\overline{D}_{2p+1}(\text{test}) - \overline{D}_{2p+2}(\text{test})) \times \overline{D}_{2p+1} \end{array} \right\} \quad \text{multiplier 8}$$

Finally, an amount of a squared mean value of the demodulated data is determined by:

$$\frac{x_{test} \times \{(\overline{D}_{2p+1}(\text{test}) + \overline{D}_{2p+2}(\text{test})) \times \overline{D}_{2p+1} - (\overline{D}_{2p+1}(\text{test}) - \overline{D}_{2p+2}(\text{test})) \times \overline{D}_{2p+2}\}}{\overline{D}_{2p+1}^2(\text{test}) + \overline{D}_{2p+2}^2(\text{test})} \to x_{2p+1} \quad \text{divider. 1}$$

$$\frac{x_{test} \times \{(\overline{D}_{2p+1}(\text{test}) + \overline{D}_{2p+2}(\text{test})) \times \overline{D}_{2p+2} + (\overline{D}_{2p+1}(\text{test}) - \overline{D}_{2p+2}(\text{test})) \times \overline{D}_{2p+1}\}}{\overline{D}_{2p+1}^2(\text{test}) + \overline{D}_{2p+2}^2(\text{test})} \to x_{2p+2} \quad \text{divider. 2}$$

Therefore, the demodulated data is adjusted.

Demodulation data is obtained at every $2\alpha n$ number of data from the AD converter which is the frame of one modulation. Phase adjustment of $\overline{D}_{2p+1}$, $\overline{D}_{2p+2}$ may be obtained in every carrier at a $2\alpha n$ clock interval. To increase the efficiency of the circuit, the size of the circuit may be decreased by using a time sharing phase adjustment circuit.

Figure 5:
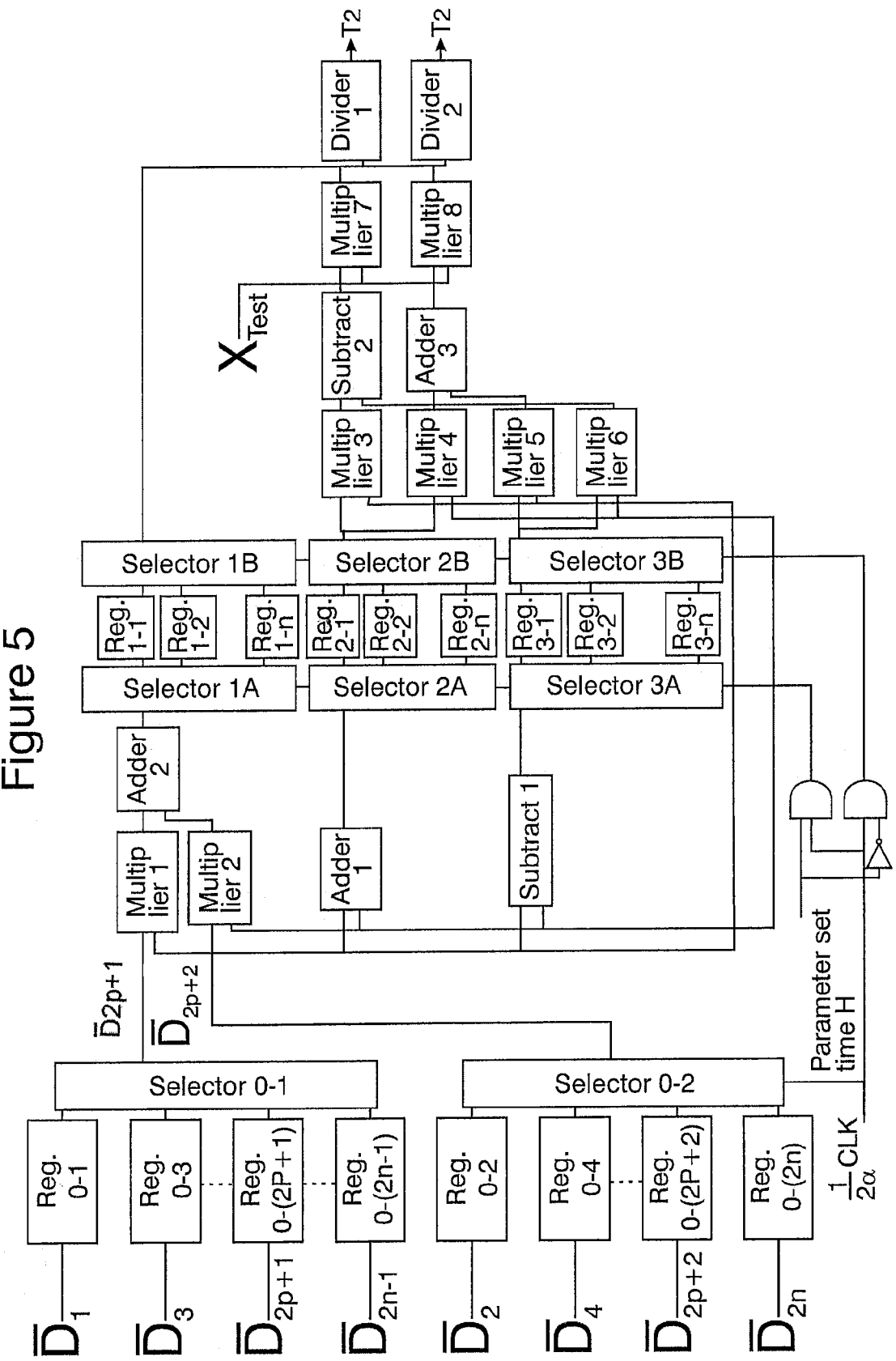
FIG. 5: Block diagram of distributed time phase and magnitude adjustment.

The time sharing phase adjustment circuit is represented in FIG. 5. $\overline{D}_{2p+1}$ and $\overline{D}_{2p+2}$ detect and store demodulated data before phase adjustment, and send one block by selector o to the phase adjustment circuit at every one frame. In the time sharing phase adjustment circuit, a number of n registers (regardless of DFF1, DFF2 and DFF3 which are represented in the phase adjustment circuit of FIG. 4 for one sub-carrier frequency) are selected one by one by selector 1A,2A,3A synchronized to selector 0, and are stored as the parameter of every sub-carrier in one round of selector 1A,2A,3A when the parameter is decided in system.

In practical communication, the parameters corresponding to the index of sub-carrier are selected by the selector 1B,2B, 3B synchronized to the selector 0 regardless of operation DFF4 and DFF5. The calculation in the circuit is done ideally by a pipe-line operation. Therefore phase adjusted demodulation data are sent from the time sharing phase adjustment circuit continuously.

Figure 6:
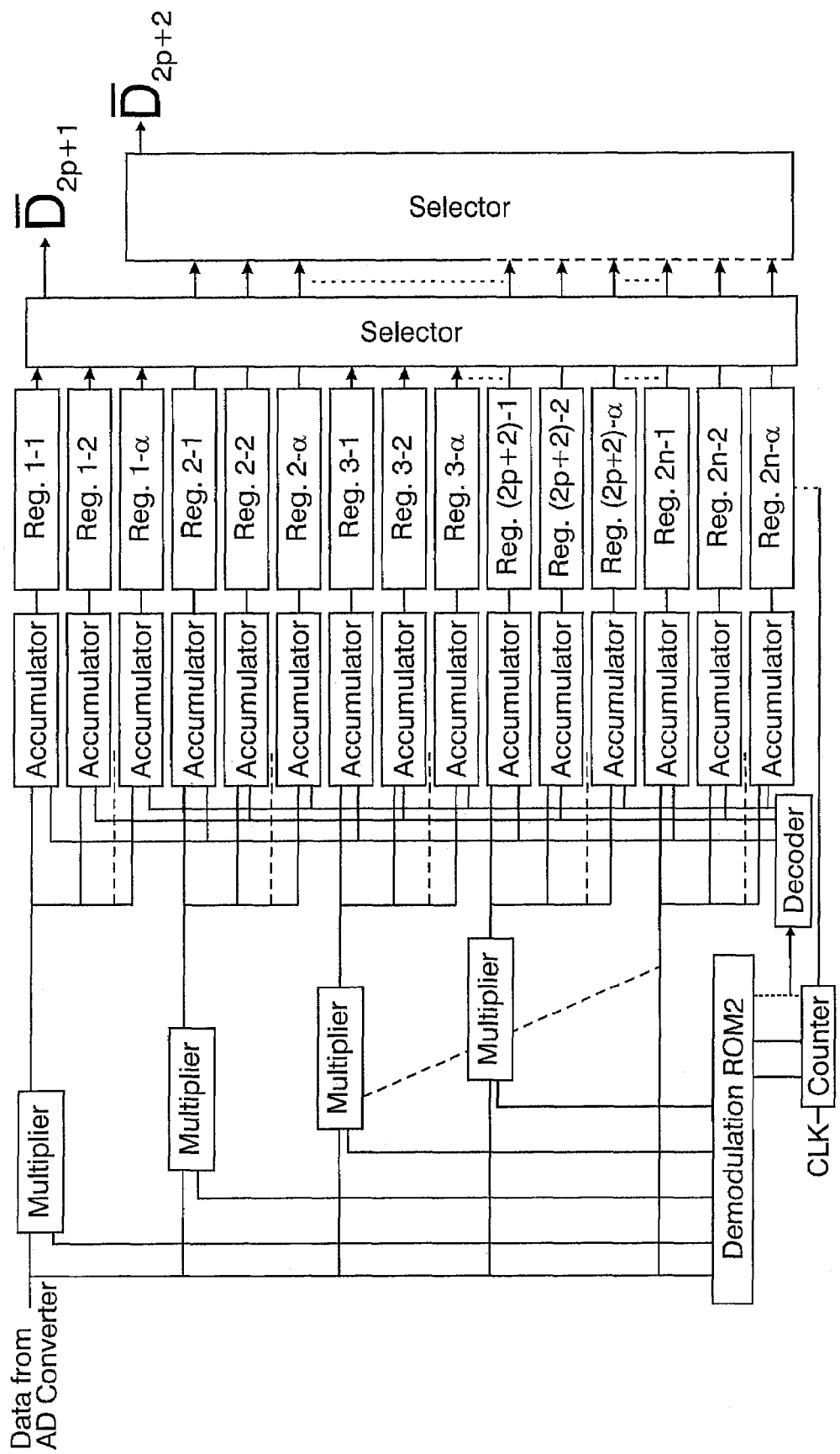
FIG. 6: Block diagram of demodulation for synchronization.
Figure 7:
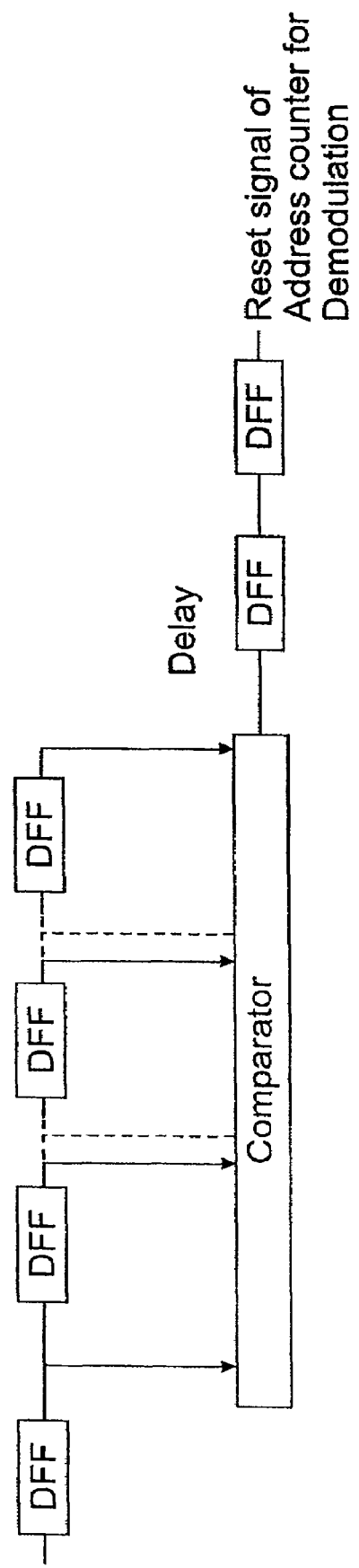
FIG. 7: Block diagram of adjustment signal.

A demodulation circuit block diagram for synchronization is represented in FIG. 6. An address counter for demodulation is used for this circuit and outputs $2\alpha n$ addresses. Demodulation ROM2 has $2\alpha n$ addresses and 4nW wide data bus. ROM2 obtains the memory data $G_{2p+1}(i)$ and $G_{2p+2}(i)$ belonging to one carrier frequency p from the demodulation ROM1 and the data of the other block of memory are moved a address each other to the end of memory address. Data of this ROM2 is 4nW wide, which is 2nW numbers of cosine data and 2nW number of sine data. In one clock interval, demodulation ROM2 outputs 4nW wide data, with which the data from AD converter is multiplied and accumulated by a number individually and selected as $\overline{D}_{2p+1}$ and $\overline{D}_{2p+2}$ to the time sharing phase adjustment circuit. Time sharing phase adjustment circuit is operated not by the half clock but by the clock of address counter divided by $2\alpha$. At least one out put of the time sharing adjustment circuit is sent to synchronization circuit represented in FIG. 7 to detect frame synchronized signal. A series of adjusted demodulated data for synchronization are shifted by equal or less than $\alpha$ number of DFF, and each shifted data are compared, and synchronization signal is output in case of all equal data. This synchronization signal is shifted as long as there is a delay between synchronization circuit and address counter for demodulation, and resets the counter for demodulation to synchronize the counter for demodulation with the counter for modulation of the other side terminal.

With respect to a method of sub-carrier frequency determination, the cosine and sine wave equation of sub-carrier number p are:

$$\cos\left\{\frac{2\pi f_p}{\rho \times \alpha \times f_0}(\alpha q + r)\right\}$$

$$\sin\left\{\frac{2\pi f_p}{\rho \times \alpha \times f_0}(\alpha q + r)\right\}$$

and the following equation for sub-carrier frequency reference is:

$$\sum_{q=0}^{(2n-1)} \cos^2\left\{\frac{2\pi f_p}{\rho \times \alpha \times f_0}(\alpha q + r)\right\} = \sum_{q=0}^{(2n-1)} \sin^2\left\{\frac{2\pi f_p}{\rho \times \alpha \times f_0}(\alpha q + r)\right\}$$

This equation is solved for many $f_p$ by which a matrix and an inverse matrix are formed. The difference of range in the inverse matrix elements are not so wide or so close to zero such that the proper $f_p$ are selected.

The transmission speed is next described.

For the sampling clock (CLK) of the DA converter, a highest frequency of sub-carrier is $f_0$ and $\rho$ is the sampling number in one wave of the highest frequency of the sub-carrier, such that:

$$\text{CLK} = \rho \times \alpha \times f_0 = \rho \alpha f_0$$

The number of sampling of one frame in modulation is the same as the number of addresses of modulation ROM, that is $2\alpha n$. The bits wide of the modulation data are specified as A, then the total bits wide of the modulation data are 2nA. Therefore the transmission speed is:

$$\frac{CLK}{2\alpha n} \times 2nA = CLK \times \frac{A}{\alpha}$$

Figure 8:
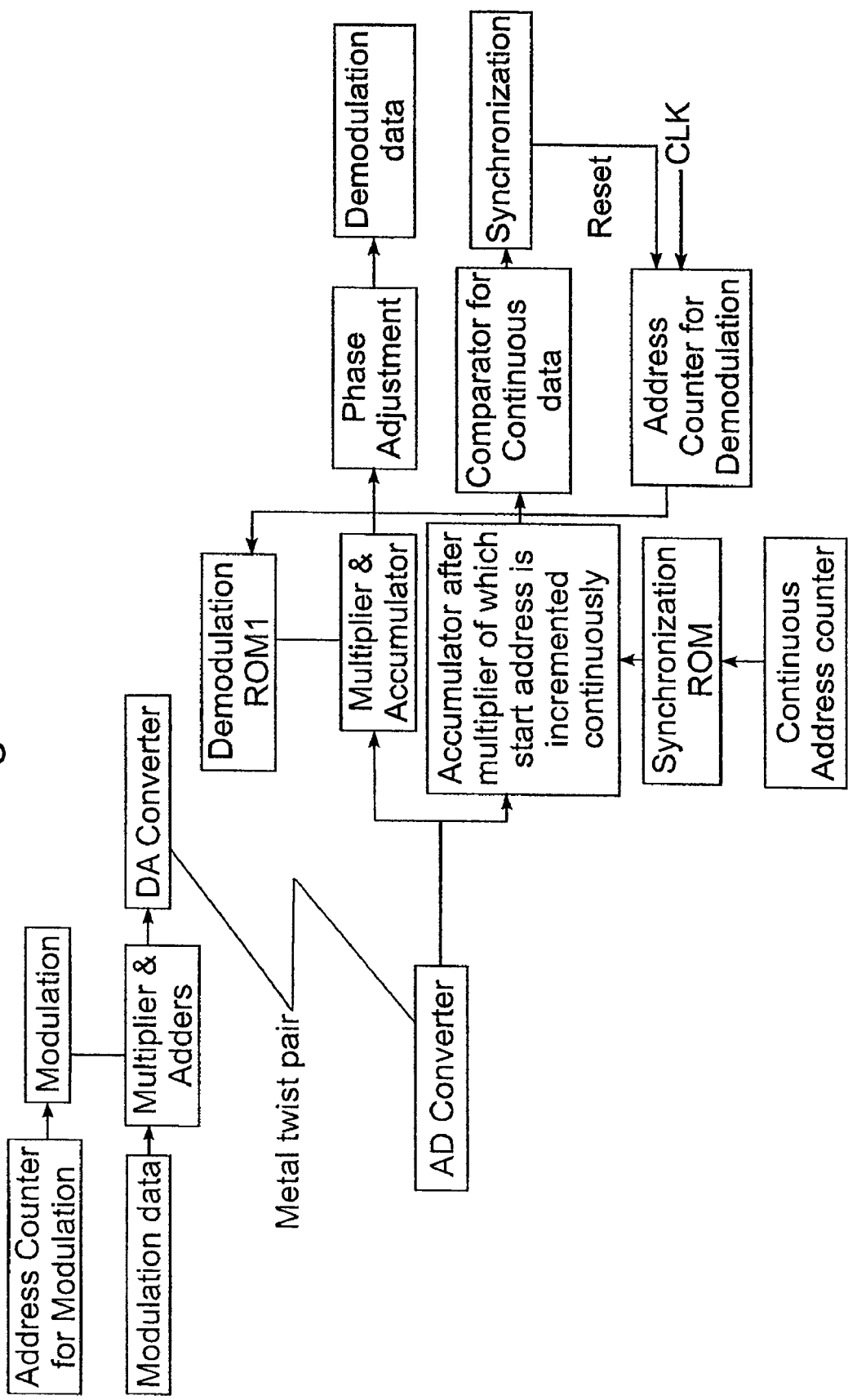
FIG. 8: Block diagram of adjustment signal.

Another embodiment of the synchronization block diagram is represented in FIG. 8. Although the modulation data are the same in the first two rounds of addresses for modulation and the same in second two rounds of addresses of modulation, the modulation data of the sub-carrier which is specified using synchronization should be different in the first two rounds of addresses from in the second two rounds of addresses. The data of demodulation ROM1 which is used for synchronization is called a synchronization ROM. The address of the synchronization ROM is connected to the continuous address counter.

Figure 9:
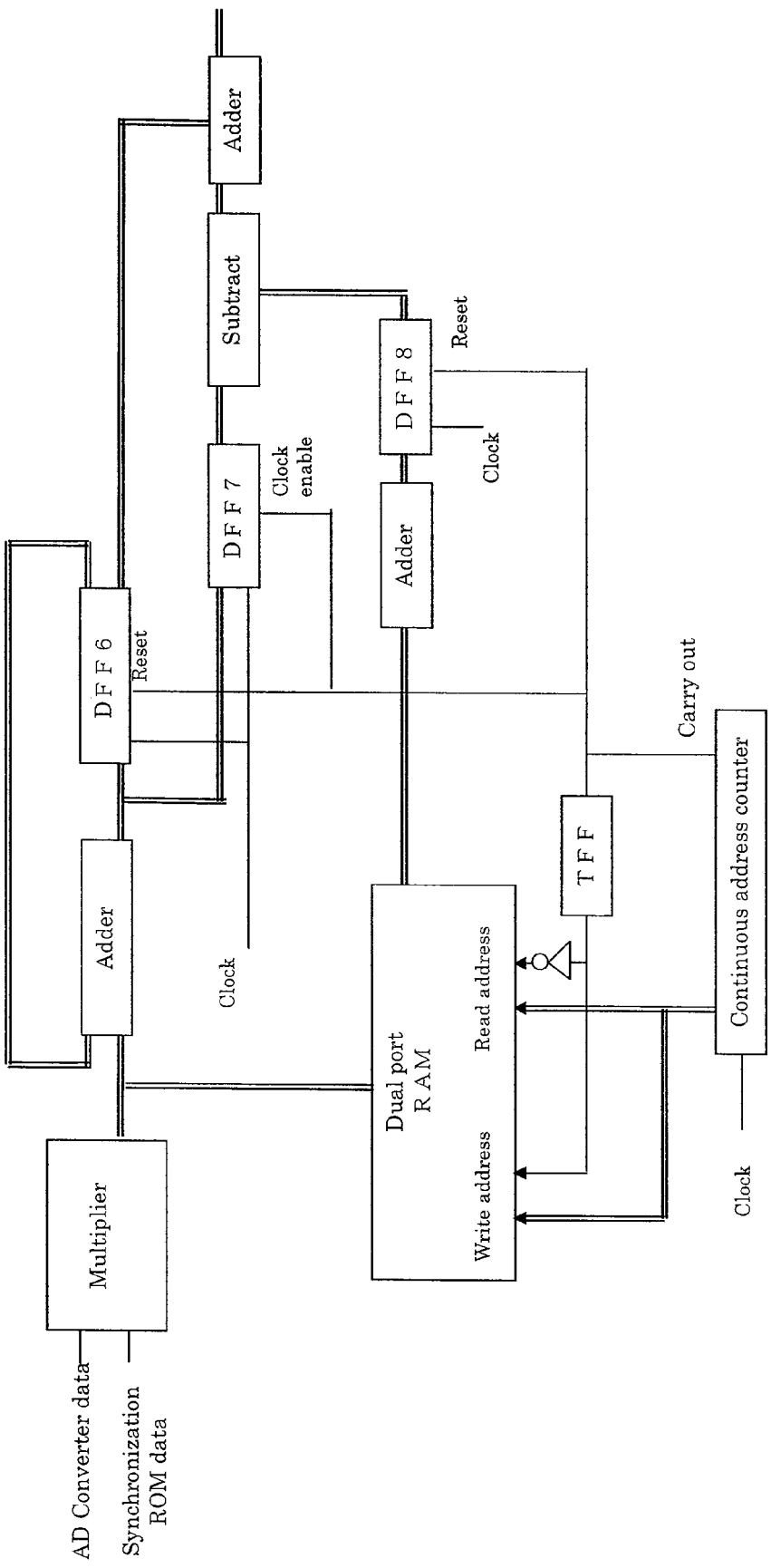
FIG. 9: Block diagram of adjustment signal.

The product of the data from the AD converter and the data of the synchronization ROM is accumulated for the one round address of demodulation circuit. The accumulator, which starts accumulation from every address for one round of addresses to continuously output a result, is provided in the synchronization circuit. These values of the accumulator, after multiplying, are not different from each other for the term of the same modulation data, but are different from each other for the term of different modulation data. In the synchronization circuit, this property contributes to form a synchronization signal which is output by the comparator indicating the equality or the difference between the two series of adjusted demodulated data. The multiplier and accumulator starting from every address is represented in FIG. 9.

The data from the AD converter and the data of the synchronization ROM are multiplied by the circuit of the multiplier, and sent to the circuit of the accumulator. The output of the accumulator is sent to DFF6 by every clock, and is returned to the accumulator to be added with the next data, one after another. A carry-out signal, which is output at every one round of address counter, reset DFF6, and another DFF7 store the last accumulated value as the data of accumulation. This accumulating operation is same as in the demodulation circuit. From a previous accumulation operation until a next accumulation operation, the accumulator, which starts accumulation from every address for one round addresses, is operated as follows. The accumulated data until this time of a previous round in DFF8 is subtracted from the previously accumulated data in DFF7 and is added by newly accumulated data until this time in DFF6, and outputs this data at every address.

To achieve this operation, a dual-port RAM is used that has a highest write address bit connected through a toggle flip-flop (TFF) to a carry-out of address counter and the lower address connected to an address counter output. The dual-port RAM has a read address that is similar to a write address with an inverted highest address, and outputs the previous round data, which are accumulated and stored in DFF8, and the above subscription is obtained.

The demodulation data is adjusted in case of an over-ride by subscripting the product and in case of less number adding the product, by detecting whether a number of address counter for demodulation is continuous or not at synchronization.

EXAMPLE

A first example is provided below and discussed with respect to FIGS. 10-20.
Number of carrier frequencies n=4
Number of over-sampling α=4
Type of wave s s=1 indicate cosine wave s=2 indicate sine wave
With respect to the modulation matrix:
number of rows i i=1~32
number of columns j j=1~8
sub-carrier frequency number p p=0~3
original sampling order q q=0~7
order of over-sampling r r=1~4
i=αq+r=4q+r
j=2p+s The elements of the matrix are:

$$F_j(i)=F_{2p+s}(4q+r)$$

A number of original sampling in one complete wave form ρ=2.399

$$F_{2p+s}(4q+r) = \cos\left\{\frac{2\pi f_p}{9.596\ f_0}(4q+r)\right\} \text{ in case of } s=1$$

$$= \sin\left\{\frac{2\pi f_p}{9.596\ f_0}(4q+r)\right\} \text{ in case of } s=2$$

$f_0$=1.0423 MHz
$f_1$=0.7809 MHz
$f_2$=0.6255 MHz
$f_3$=0.4684 MHz
The basic sampling interval 383.7 nSec
The over-sampling interval 95.9 nSec FIG. 10 is an example illustrating values stored as a modulation matrix based on the above parameters. FIG. 11A is an example illustrating a method for generating a demodulation matrix from the modulation matrix shown in FIG. 10. In FIG. 11A, the matrix has a size of 8 rows and 8 column by selecting row number r=1 from the modulation matrix of FIG. 10. A demodulation matrix is formed from the inverse of the matrix shown in FIG. 11A. FIGS. 11B-11D illustrate the demodulation matrices 1-4 formed using the modulation matrix shown in FIG. 10.

The frequency of sub-carriers is determined as shown below.

r=1 α=4 ρ$f_0$=2.5×1.0 and according to the equation shown below:

$$\sum_{q=0}^{n-1} \cos^2 \frac{2\pi f_p}{\rho \times \alpha \times f_0} = \sum_{q=0}^{n-1} \sin^2 \frac{2\pi f_p}{\rho \times \alpha \times f_0}$$

$f_0$=1.0423 MHz $f_1$=0.7809 MHz
$f_2$=0.6255 MHz $f_3$=0.4684 MHz Therefore ρ=2.399 is obtained.

If the bit width of the modulation data is only one bit, the transmission speed is 2.399×4×1.0423×1/4=2.5 Mbps.

Elements data of modulation matrix and demodulation matrices 1~4 should be changed to positive hex numbers and stored in the associated ROM. An example method about cos θ_is described below.

$$\frac{\cos\theta + 1}{2} \times 65535$$

$$\frac{\text{data of demodulation matrix} + (\text{absolute maximum negative data of demodulation matrix})}{(\text{absolute maximum negative data of demodulation matrix}) \times 2} \times 65535$$

By the above equation, cos θ values of the modulation matrix and of demodulation matrices 1~4 are changed to positive decimal numbers and are changed to hex numbers and stored in the associated ROM.

In this example, each address of the ROMS are i1 and q and the number of the port is j and 16 bits wide.

At first, in a test communication, the modulation is performed so that all modulation data are 15(F).

$$x_{1=x2=x3=\ldots x8}=15$$

FIG. 12A is an example of modulated data that is provided to the DA converter input using the above data input of 15. FIG. 12B is an example of the data received by the demodulation circuit illustrating that the modulated data shown in FIG. 12A is changed a little by noise of the line to the demodulation circuit.

The above data shown in FIG. 12B is delayed by one over-sampling and demodulated using the demodulation matrices 1~4. FIG. 13A is an example illustrating the mean value of the demodulation data. FIGS. 13B-13D are examples illustrating the determined parameters of adjustment.

Next, modulation data are generated from input data of $x_1=x_5=1$, $x_2=x_6=15$, $x_3=x_7=-1$, and $x_4=x_8=-15$. FIG. 14A is an example of modulated data that is generated using the above input data for practical communication. FIG. 14B is an example of the data received by the demodulation circuit illustrating that the modulated data shown in FIG. 14A is changed a little by noise of the line to the demodulation circuit.

The above data shown in FIG. 14B is delayed by one over-sampling and demodulated using the demodulation matrices 1~4. FIG. 15A is an example illustrating the mean value of the demodulation data. FIG. 15B is an example that illustrates the output adjusted data by the adjustment circuit using the determined adjustment parameters. FIG. 15C is an example illustrating rounded of the data shown in FIG. 15B. As illustrated in FIG. 15C, this demodulation data is the same as the modulation data of the transmission side.

FIG. 16 is an example illustrating the stored data in modulation ROM where the data of the modulation matrix is exchanged to positive Hex data. FIGS. 17A-17D are examples illustrating demodulation ROMS1-(1~4), respectively, where the data of the demodulation matrices 1~4 are exchanged to positive Hex data. Before multiplication, data stored in the associated ROM is exchanged to a number indicating a positive or a negative value. In addition, the modulation data is exchanged to a number having a positive or a negative sign. Where Di is 8 bit modulation, the equation of exchange is:

$$2 \times Di - 255$$

When the result of the calculation process is output, the data is obtained by an inverse exchange.

FIG. 18 is an example illustrating the combination of the four demodulation ROMS shown in FIGS. 17A-17D, for which data is placed at a proper over-sampling timing position so that demodulation ROM1 includes the combined data of four ROMS. The circuit block diagram which uses the combined data in the number of the over-sampling of demodulation ROM1 is represented in FIG. 5. The circuit block diagram outputs the demodulation data which is accumulated and divided by α.

FIGS. 19A-19D are examples illustrating respective demodulation ROM2-(1~4) for synchronization. The p=0 block of ROM1 arranges addresses incrementally. These four demodulation ROMs are combined into one by the method described in this example. FIGS. 20A and 20B are examples illustrating demodulation ROM2 that are the combined ROM for synchronization.

EXAMPLE

The effect of this invention applied to DSL of a metal twist pair is described below with respect to a further example. The parameters of the modulation and demodulation system are different from the previous example and are determined below.

| | |
|---|---|
| Number of carrier frequency | n = 16 |
| Number of over-sampling | α = 8 |
| Bit wide of modulation data | A = 8 ビット |
| Numbers of basic sampling in one wave form | ρ |
| Most high frequency of sub-carrier | $f_0$ | defined as $\rho f_0$=12.5 MHz. Sampling frequency CLK of DA and AD converter is $$CLK = \rho \times \alpha \times f_0 = 12.5 \times 8 = 100 \text{ MHz}$$

Transmission speed is $$CLK \times \frac{A}{\alpha} = 100 \times \frac{8}{8} = 100 \text{ Mbps}$$

For the frequency of the sub-carriers in the frequency range of 6.0 MHz~0.09 MHz:

$$\sum_{q=0}^{31} \cos^2 \frac{2\pi f_p}{8 \times 12.5}(8q+1) \cong \sum_{q=0}^{31} \sin^2 \frac{2\pi f_p}{8 \times 12.5}(8q+1)$$

The frequency is determined as:

$f_0$ = 0.0950 MHz   $f_1$ = 0.473 MHz   $f_2$ = 0.852 MHz   $f_3$ = 1.231 MHz $f_4$ = 1.610 MHz    $f_5$ = 1.989 MHz   $f_6$ = 2.368 MHz   $f_7$ = 2.747 MHz $f_8$ = 3.314 MHz    $f_9$ = 3.693 MHz   $f_{10}$ = 4.072 MHz  $f_{11}$ = 4.451 MHz $f_{12}$ = 4.830 MHz  $f_{13}$ = 5.208 MHz  $f_{14}$ = 5.588 MHz  $f_{15}$ = 5.966 MHz

The invention claimed is:

1. A modulation and demodulation system of n sub-carrier frequencies, where n is a positive integer, and an oversampling parameter α, where α is a positive integer, comprising:
   a modulation circuit comprising:
   2n numbers of a modulation ROM having a 2αn wide address, a size of the modulation ROM based on the oversampling parameter, the modulation ROM storing columns of elements independently in a modulation ROM matrix in the address according to a sampling order, where the elements are a value of trigonometric sine and cosine of the sub-carrier frequencies; and
   a demodulation circuit comprising:
   2n numbers of a first demodulation ROM (ROM1) having a 2αn wide address, the ROM1 having rows and columns of 2αn and 2n, respectively, the ROM1 storing elements of a combined matrix,
      wherein the combined matrix is generated by arranging in a matrix an α number of inverse matrices according to the oversampling parameter, each of the α number of inverse matrices are the inverse of respective portions of the modulation ROM.

2. The modulation and demodulation system according to claim 1, wherein each sub-carrier frequency is determined to be a minimum difference of an accumulated square value of cosine data and sine data obtained from the modulation ROM by an α interval of the same sub-carrier frequency.

3. The modulation and demodulation system according to claim 1, further comprising a synchronization circuit, wherein:
   a first two series of modulation data are the same and the modulation data of a respective sub-carrier that is specified for synchronization is different in a next two series from the first two series of the modulation data,
   the data of ROM1 used for synchronization is obtained for the corresponding synchronization sub-carrier for modulation and specified for an address by a continuous number different from the ROM1 address,
   the data of the ROM1 used for synchronization is multiplied with AD converted data from the demodulation circuit and accumulated for one round of an address number from every address and provides an amount value at every instance in time, and
   a comparator compares the amount value for the current instance in time and a following amount value for a following instance in time to determine a difference for the synchronization signal.

4. The modulation and demodulation system according to claim 1, the demodulation circuit further comprising a detection circuit comprising a partial oscillator, a mixer and a mid-frequency filter, wherein a modulation block provides a same signal as a DA converter of the modulation circuit at an output of the mid-frequency filter by a modulation method.

5. The modulation and demodulation system according to claim 1, wherein elements of the modulation ROM are respective products of elements of a trigonometric modulation ROM and the elements correspond to a same size matrix at a same position of each matrix, and the ROM1 is an inverted matrix of the modulation ROM.

6. The modulation and demodulation system according to claim 1, wherein each sub-carrier frequency is determined to be a minimum difference between an accumulated value of cosine data to a power of m and an accumulated value of sine data to the power m, the cosine and sine being obtained from the modulation ROM by an α interval of a same sub-carrier frequency, by a positive integer number of m.

7. The modulation and demodulation system according to claim 1, the modulation and demodulation system further comprising:
   the modulation circuit further including:
   a) a 2n number of multipliers, the 2n number of multipliers multiplying 2n numbers of modulation data and elements of the 2n numbers of the modulation ROM,
   b) an accumulator, the accumulator summing together all data from products of the 2n number of multipliers, and
   c) a DA converter, the DA converter converting digital data from the accumulator to analog data; and
   the demodulation circuit further including:
   a) 4n numbers of a second demodulation ROM (ROM2) having a 2αn wide address, the 4n numbers of the ROM2 storing respective pairs of ROM1 corresponding to the trigonometric sine and cosine of the same sub-carrier frequency and storing column data which is shifted by a respective α number,
   b) a 2n number of multipliers, the 2n number of multipliers multiplying input data with elements of each ROM1,
   c) a 2n number of accumulators, the 2n number of accumulators accumulating products of the 2n number of multipliers and resetting the products of the 2n number of multipliers at every 2αn block of data,
   d) a 4n number of multipliers, the 4n number of multipliers multiplying the input data with data of each ROM2,
   e) a 4αn number of accumulators, the 4αn number of accumulators partially accumulating products of the 4n number of multipliers by a number and resetting the products of the 4n number of multipliers at every 2αn block of data,
   f) phase adjustment circuits, the phase adjustment circuits are applied to the products accumulated by the 2n accumulator and the 4αn accumulator,
      wherein the accumulated data is of trigonometric cosine and sine waves of the same sub-carrier frequency,
   g) a synchronization circuit, the synchronization circuit receives the 4αn partially accumulated product data and adjusted about a phase from the respective phase adjustment circuit, the received data are provided to a comparator in accordance with a shifting number, and
   h) an address counter for demodulation, the address counter is reset using the comparator of the synchronization circuit.

8. A demodulation system of n sub-carrier frequencies, where n is a positive integer, and an oversampling parameter α, where α is a positive integer, comprising:
   a demodulation circuit including:
   a) 2n numbers of a first demodulation ROM (ROM1) having a 2αn wide address, the ROM1 having rows and columns of 2αn and 2n, respectively, the ROM1 storing elements of a combined matrix,
      wherein the combined matrix is generated by arranging in a matrix an α number of inverse matrices according to the oversampling parameter, each of the α number of inverse matrices are the inverse of respective portions of a modulation ROM from a modulation system, each portion of the modulation ROM of size 2n by 2n,
   b) a 2n number of multipliers, the 2n number of multipliers multiplying input data with the elements of each ROM1, and
   c) a 2n number of accumulators, the 2n number of accumulators accumulating products of the 2n number of multipliers and resetting the products of the 2n number of multipliers at every 2αn block of data.

9. The demodulation system according to claim 8, the demodulation circuit further comprising:
   a) 4n numbers of a second demodulation ROM (ROM2) having a 2αn wide address, the 4n numbers of ROM2 storing pairs of ROM1 corresponding to a trigonometric sine and cosine of the same sub-carrier frequency and storing columns data which are shifted by a respective α number,
   b) a 4n number of multipliers, the 4n number of multipliers multiplying the input data with data of each ROM2,
   c) a 4αn number of accumulators, the 4αn number of accumulators partially accumulating products of the 4n number of multipliers by a number and resetting the products of the 4n number of multipliers at every 2αn block of data, d) phase adjustment circuits, the phase adjustment circuits are applied to products accumulated by the 2n accumulator and the 4αn accumulator,
e) a synchronization circuit, the synchronization circuit receives a further partially accumulated product data by the number and adjusted about a phase from the respective phase adjustment circuit, the received data are provided to a comparator in accordance with a shifting number, and
f) an address counter for demodulation, the address counter is reset using the comparator of the synchronization circuit.

10. The demodulation system according to claim 9, the respective products accumulated by the 2n accumulator and the 4αn accumulator, wherein the accumulated data is of trigonometric cosine and sine waves of the same sub-carrier frequency.

11. The demodulation system according to claim 9, wherein the synchronization circuit receives the 4αn partially accumulated product data from the output of the 4αn numbers of accumulator.

* * * * *